US012746659B2

(12) United States Patent
Blandford et al.

(10) Patent No.: US 12,746,659 B2
(45) Date of Patent: Sep. 29, 2026

(54) DEPLOYABLE ROBOTIC ARM MOUNT

(71) Applicant: Verifi Technologies, LLC, Waco, TX (US)

(72) Inventors: Benjamin M. Blandford, Waco, TX (US); Gary Georgeson, Tacoma, WA (US); Nathaniel J. Blackman, Hewitt, TX (US)

(73) Assignee: Verifi Technologies, LLC, Waco, TX (US)

( * ) Notice: Subject to any disclaimer, the term of this patent is extended or adjusted under 35 U.S.C. 154(b) by 205 days.

(21) Appl. No.: 18/618,585

(22) Filed: Mar. 27, 2024

(65) Prior Publication Data

US 2024/0342895 A1 Oct. 17, 2024

Related U.S. Application Data

(60) Provisional application No. 63/457,584, filed on Apr. 6, 2023.

(51) Int. Cl.
*B25J 9/00* (2006.01)
*F16B 47/00* (2006.01)

(52) U.S. Cl.
CPC ............. *B25J 9/0009* (2013.01); *F16B 47/00* (2013.01)

(58) Field of Classification Search
CPC ................................ B25J 9/0009; F16B 47/00
USPC ......................... 248/550, 682, 685, 687, 362
See application file for complete search history.

(56) References Cited

U.S. PATENT DOCUMENTS

| | | | | |
|---|---|---|---|---|
| 2,665,872 | A * | 1/1954 | Louis, I | A47G 29/093 248/362 |
| 3,635,427 | A * | 1/1972 | Balke | B64C 27/001 244/17.27 |
| 4,006,876 | A * | 2/1977 | O'Connor | F16M 11/245 248/171 |
| 4,265,326 | A * | 5/1981 | Lauber | E02F 9/04 180/8.3 |
| 4,558,758 | A * | 12/1985 | Littman | B66F 11/046 182/2.11 |
| 5,137,101 | A * | 8/1992 | Schaeff | B62D 57/00 180/8.1 |
| 7,677,861 | B1 * | 3/2010 | Fehringer | B66C 13/40 212/231 |
| 7,859,749 | B2 | 12/2010 | Fox et al. | |
| 9,174,488 | B2 * | 11/2015 | Berry | B60B 35/10 |
| 9,408,452 | B1 * | 8/2016 | Al-Khulaifi | A46B 15/0002 |
| 9,950,813 | B2 * | 4/2018 | Hafenrichter | G01N 29/04 |
| 10,562,364 | B2 * | 2/2020 | Crook | B62D 5/26 |
| 10,955,310 | B2 | 3/2021 | Hafenrichter et al. | |
| 11,300,477 | B2 | 4/2022 | Hafenrichter et al. | |
| 11,485,029 | B2 * | 11/2022 | Han | B25J 18/04 |
| 2008/0077276 | A1 * | 3/2008 | Montero Sanjuan | B23B 39/14 901/1 |

(Continued)

*Primary Examiner* — Muhammad Ijaz
(74) *Attorney, Agent, or Firm* — Neo IP

(57) ABSTRACT

The present invention is directed to supports for robotic arms, and more specifically to portable, deployable supports for robotic arms for use in nondestructive testing. The robotic arm support of the present invention includes retractable extensions configured to collapse into a robotic arm mount. The extensions include suction cups for attachment, unattachment, and reattachment of the mount to a surface. The robotic arm mount includes a cavity into which a robotic arm is inserted and secured to conduct nondestructive testing of specimens.

19 Claims, 19 Drawing Sheets

(56) References Cited

U.S. PATENT DOCUMENTS

| | | | | |
|---|---|---|---|---|
| 2014/0000982 | A1* | 1/2014 | Barnhill | B25J 19/021 182/133 |
| 2014/0237793 | A1* | 8/2014 | Gamboa | F16B 47/00 403/33 |
| 2016/0288339 | A1* | 10/2016 | Akaha | B25J 9/046 |
| 2017/0106924 | A1* | 4/2017 | Hafenrichter | B25J 15/0019 |
| 2019/0111649 | A1* | 4/2019 | Johnson | B31B 50/005 |
| 2020/0180168 | A1* | 6/2020 | Han | B25J 9/1628 |
| 2021/0162610 | A1* | 6/2021 | Kieffer | B25J 15/0408 |
| 2021/0338032 | A1* | 11/2021 | Vezina | B25J 11/0085 |
| 2021/0347060 | A1 | 11/2021 | Byl et al. | |
| 2021/0387834 | A1 | 12/2021 | Olberg et al. | |
| 2022/0219319 | A1* | 7/2022 | Khajepour | B25J 9/0051 |
| 2022/0347831 | A1* | 11/2022 | Jeon | B62D 65/18 |
| 2022/0363326 | A1* | 11/2022 | El-Khasawneh | B25J 9/0036 |
| 2023/0286344 | A1* | 9/2023 | Chung | B60G 3/14 |
| 2024/0001565 | A1* | 1/2024 | Vidal | B25J 15/0616 |
| 2024/0025500 | A1* | 1/2024 | Cieslak | B62D 57/02 |
| 2024/0083025 | A1* | 3/2024 | Fujita | B25J 9/1633 |
| 2024/0342895 | A1* | 10/2024 | Blandford | B25J 9/0009 |
| 2025/0196558 | A1* | 6/2025 | Choi | B60G 17/0152 |
| 2025/0256405 | A1* | 8/2025 | Wang | B25J 9/0009 |
| 2025/0262744 | A1* | 8/2025 | Mendez | B25H 1/06 |
| 2025/0276439 | A1* | 9/2025 | Park | B25J 18/00 |

* cited by examiner

DEPLOYABLE ROBOTIC ARM MOUNT

CROSS-REFERENCE TO RELATED APPLICATIONS

This application is related to and claims priority from the following US patents and patent applications: this application claims priority from and the benefit of U.S. Provisional Patent Application No. 63/457,584, filed Apr. 6, 2023, which is incorporated herein by reference in its entirety.

BACKGROUND OF THE INVENTION

1. Field of the Invention

The present invention relates to supports for robotic arms, and more specifically to portable, deployable supports for robotic arms for use in nondestructive testing.

2. Description of the Prior Art

It is generally known in the prior art to provide robotic arms for nondestructive testing of test objects in a variety of industries, including aerospace, automotive and other manufacturing industries.

Prior Art Patent Documents Include the Following:

U.S. Pat. No. 9,950,813 for Non-destructive inspection of airfoil-shaped body using self-propelling articulated robot by inventors Hafenrichter et al., filed Feb. 5, 2016 and issued Apr. 24, 2018, discloses a robotic apparatus comprising an articulated arm mounted to a chassis and having an end effector capable of inspecting the root and tip, as well as the length between the root and tip, of an airfoil-shaped body (such as a rotorblade). The robotic apparatus has means for propelling the chassis in a spanwise direction. The chassis-mounted articulated arm facilitates the scanning of sensors over the root or tip of the airfoil-shaped body without repositioning the chassis.

U.S. Pat. No. 11,300,477 for Apparatus for automated maintenance of aircraft structural elements by inventors Hafenrichter et al., filed Jan. 9, 2020 and issued Apr. 12, 2022, discloses an automated apparatus for performing maintenance functions on airfoil-shaped bodies having short chord lengths, the apparatus being movable in a spanwise direction along the airfoil-shaped body. In accordance with various embodiments, the apparatus comprises a blade crawler capable of supporting any one of a plurality of end effectors for performing a set of maintenance functions on an airfoil-shaped body, such as a blade component. Included in these functions are multiple options for nondestructive inspection, drilling, grinding, fastening, appliqué application, scarfing, ply mapping, depainting, cleaning, and painting devices that are attached as the end effector for the blade crawler. As a whole, the blade crawler reduces maintenance time, labor hours and human errors when robotic maintenance functions are performed on blade components.

US Patent Publication No. 2021/0387834 for Gantry System and Method by inventors Olberg et al., filed Jun. 16, 2020 and published Dec. 16, 2021, discloses a multi-axis gantry system comprising a multi-axis gantry apparatus and vacuum system, and method for repositioning. The multi-axis gantry system comprises a frame. The frame includes a plurality of curved base members, a first rail, a second rail, a bridge slidably moveable along the first rail and the second rail, a carriage including an end effector, and a first plurality of pucks and a second plurality of pucks. The vacuum system comprises a vacuum controller, a first vacuum source and a second vacuum source. Each of the first and second vacuum sources is in fluid communication with one or more pucks of the first and second pluralities of pucks. The frame is reconfigurable from a first configuration mountable on a first work surface to a second configuration mountable on a second work surface that may be different from the first work surface.

US Patent Publication No. 2021/0347060 for Wheeled base by inventors Byl et al., filed Jul. 7, 2020 and published Nov. 11, 2021, discloses a robotic assistant including a wheeled base, a storage unit including drawers, a foldable arm connected to a top of the storage unit and including an end of arm tooling (EOAT) connected to a distal end of the foldable arm, an elevation mechanism positioned on the wheeled base and used to move the storage unit up and down, and a control system that receives command instructions. In response to the command instructions, the control system is configured to move the wheeled base, open or close the one or more drawers, actuate movement of the foldable arm and the EOAT to pick up and place external objects from/to a determined location, and control the storage unit to move up/down.

U.S. Pat. No. 9,408,452 for Robotic hair dryer holder system with tracking by inventor Al-Khulaifi, filed Nov. 19, 2015 and issued Aug. 9, 2016, discloses a robotic hair dryer holder system with tracking including a robotic arm mounted to a base and a brush. The base mounts to a surface of a desired location for placement of the robotic arm. The robotic arm includes a plurality of articulating members that rotate and pivot with respect to each other. A hair dryer holder is attached to a distal end of the robotic arm and includes a motion detector. The hair dryer holder selectively holds a hair dryer, and the motion detector tracks a sensor element on the brush, causing the robotic arm to follow movements of the brush to dry a user's hair.

U.S. Pat. No. 7,859,749 for Confocal microscope for imaging of selected locations of the body of a patient by inventors Fox et al., filed May 29, 2008 and issued Dec. 28, 2010, discloses a confocal imaging microscope, especially for the cellular imaging of the skin at selected locations, that is ergonomic in use, compact, and positionable at the locations thereby providing for patient comfort during imaging. The head contains an integrated assembly of the optical and mechanical components of the microscope. The assembly includes a main chassis plate. The optical components are mounted principally on one side of the plate while a PC board is mounted on the opposite side of the plate. The board mounts the electronic components, including interfaces, a microprocessor, and drivers for motors which control scanning and may also control fine positioning of the locations being imaged. The head is detachable from the arm for manual disposition which is useful when imaging, not only the skin but other tissues, especially for research in investigating living processes at the cellular level.

U.S. Pat. No. 10,955,310 for Vacuum-adhering apparatus for automated inspection of airfoil-shaped bodies with improved surface mounting by inventors Hafenrichter et al., filed Sep. 12, 2018 and issued Mar. 23, 2021, discloses a vacuum-adhering apparatus for automated non-destructive inspection (NDI) of airfoil-shaped bodies with improved surface mounting. The apparatus may be used to inspect the leading edge surface and other surfaces of a wind turbine blade, a helicopter rotor blade, or an aircraft wing. The apparatus includes a multiplicity of wheels and a multiplicity of omnidirectional rolling elements rotatably coupled to a flexible substrate made of semi-rigid material. The wheels are configured to enable omnidirectional motion of the flexible substrate. The apparatus further includes flexible vacuum seals supported by the flexible substrate and vacuum adherence devices that keep the wheels frictionally engaged on the surface of the airfoil-shaped body regardless of surface contour. The apparatus also includes a flexible sensor array attached to or integrally formed with the flexible substrate. The crawler vehicle is capable of adhering to and moving over a non-level surface while enabling the sensor array to acquire NDI scan data from the surface under inspection.

SUMMARY OF THE INVENTION

The present invention relates to supports for robotic arms, and more specifically to portable, deployable supports for robotic arms for use in nondestructive testing It is an object of this invention to provide an easily portable system for supporting a robotic arm, such that the robotic arm is able to be transported to assist in performing nondestructive testing quickly and efficiently at remote sites.

In one embodiment, the present invention is directed to a deployable robotic arm mount, including a base, including a plurality of sides, a plurality of legs connected to a bottom end of the base, configured to pivotably fold into a storage position and unfold into a deployed position, and at least one suction cup attached to an end of each of the plurality of legs, wherein a top surface of the base defines an insertion bore configured to receive a mounting portion of a robotic arm, and wherein each of the plurality of sides of the base include recesses sized and shaped to allow the plurality of legs to fold parallel to a central axis of the base in the storage position.

In another embodiment, the present invention is directed to a deployable robotic arm mount, including a base, including a plurality of sides, a plurality of legs connected to a bottom end of the base, configured to pivotably fold into a storage position and unfold into a deployed position, a plurality of feet, each connected to an end of one of the plurality of legs, and at least one suction cup attached to each of the plurality of feet, wherein a top surface of the base defines an insertion bore configured to receive a mounting portion of a robotic arm, and wherein the plurality of sides of the base include recesses sized and shaped to allow the plurality of legs to fold parallel to a central axis of the base in the storage position.

In yet another embodiment, the present invention is directed to a deployable robotic arm mount, including a base, including a plurality of sides, a plurality of legs connected to a bottom end of the base, configured to pivotably fold into a storage position and unfold into a deployed position, and a plurality of feet, each connected to an end of one of the plurality of legs, an attachment mechanism attached to each of the plurality of feet, wherein a top surface of the base defines an insertion bore configured to receive a mounting portion of a robotic arm, wherein the plurality of sides of the base include recesses sized and shaped to allow the plurality of legs to fold parallel to a central axis of the base in the storage position, and wherein the base includes one or more driver motors configured that, upon activation, cause one of more of the plurality of legs to move between the storage position and the deployed position.

These and other aspects of the present invention will become apparent to those skilled in the art after a reading of the following description of the preferred embodiment when considered with the drawings, as they support the claimed invention.

DETAILED DESCRIPTION

Figure 1:
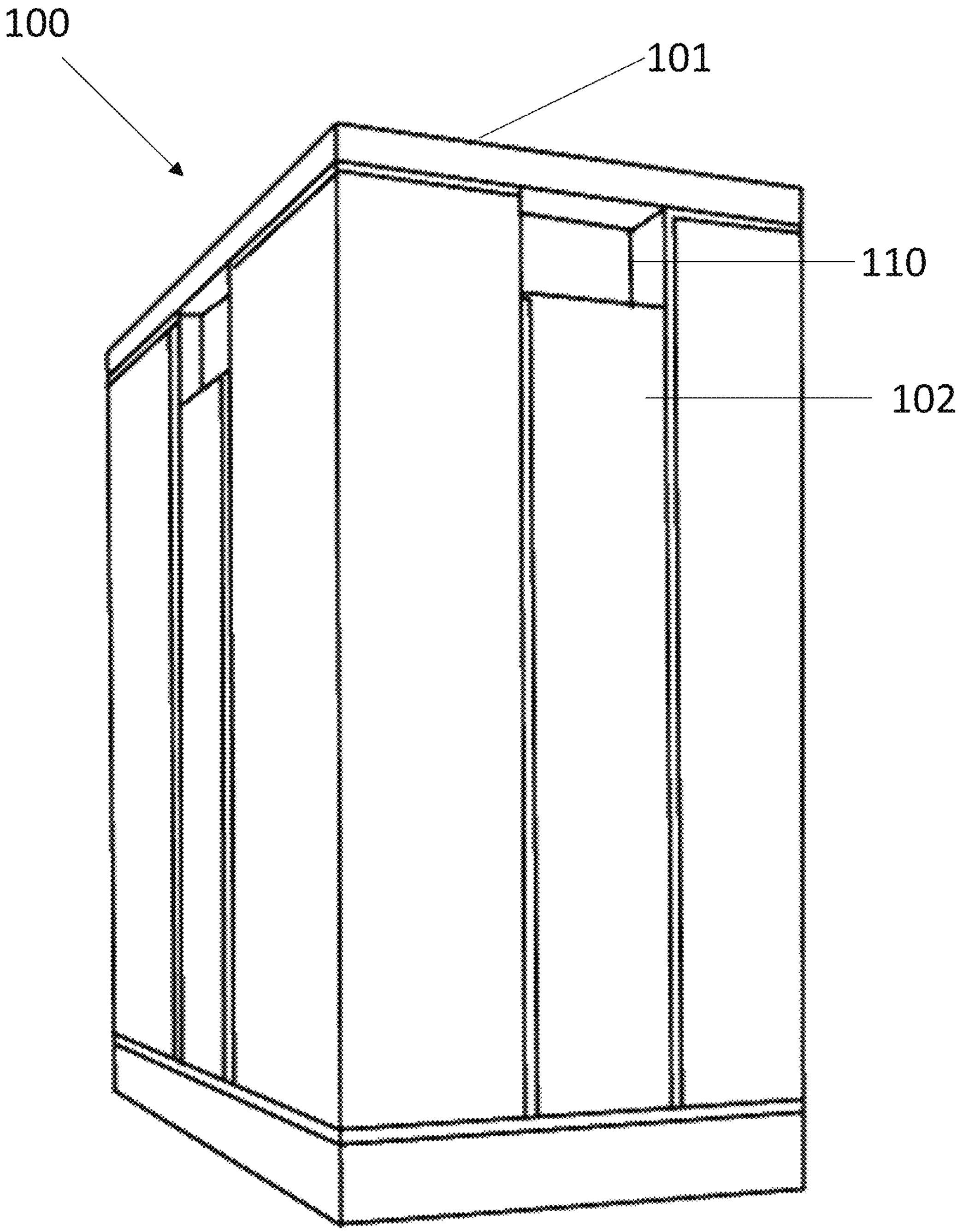
FIG. 1 illustrates an isometric view of a foldable robotic arm mount according to one embodiment of the present invention.

The present invention is generally directed to supports for robotic arms, and more specifically to portable, deployable supports for robotic arms for use in nondestructive testing. The invention generally includes a plurality of legs configured to move between a folded position and unfolded position. The legs of the present invention are generally configured to fold into a compact configuration for portability and unfold into a stable configuration for mounting a robotic arm. In one embodiment of the present invention, a suction cup is attached to the end of a collapsible leg to provide a secure attachment of the robotic arm mount to a surface.

In one embodiment, the present invention is directed to a deployable robotic arm mount, including a base, including a plurality of sides, a plurality of legs connected to a bottom end of the base, configured to pivotably fold into a storage position and unfold into a deployed position, and at least one suction cup attached to an end of each of the plurality of legs, wherein a top surface of the base defines an insertion bore configured to receive a mounting portion of a robotic arm, and wherein each of the plurality of sides of the base include recesses sized and shaped to allow the plurality of legs to fold parallel to a central axis of the base in the storage position.

In another embodiment, the present invention is directed to a deployable robotic arm mount, including a base, including a plurality of sides, a plurality of legs connected to a bottom end of the base, configured to pivotably fold into a storage position and unfold into a deployed position, a plurality of feet, each connected to an end of one of the plurality of legs, and at least one suction cup attached to each of the plurality of feet, wherein a top surface of the base defines an insertion bore configured to receive a mounting portion of a robotic arm, and wherein the plurality of sides of the base include recesses sized and shaped to allow the plurality of legs to fold parallel to a central axis of the base in the storage position.

In yet another embodiment, the present invention is directed to a deployable robotic arm mount, including a base, including a plurality of sides, a plurality of legs connected to a bottom end of the base, configured to pivotably fold into a storage position and unfold into a deployed position, and a plurality of feet, each connected to an end of one of the plurality of legs, an attachment mechanism attached to each of the plurality of feet, wherein a top surface of the base defines an insertion bore configured to receive a mounting portion of a robotic arm, wherein the plurality of sides of the base include recesses sized and shaped to allow the plurality of legs to fold parallel to a central axis of the base in the storage position, and wherein the base includes one or more driver motors configured that, upon activation, cause one of more of the plurality of legs to move between the storage position and the deployed position.

None of the prior art discloses a robotic arm mount including a base and multiple, retractable extremities allowing it to be attached and unattached to a variety of surfaces. Additionally, none of the prior art discloses a robotic arm mount with extremities configured to collapse or fold into the base of the mount with suction cups attached to the multiple extremities to stabilize a robotic arm mount when in an unfolded configuration.

With increasing complexity of mechanical parts, there has arisen a need for testing the reliability of a machine or identifying points of failure in engineered structures. One method for such testing durability is destructive testing (DT). The methods of inspection used during the destructive testing process result in the deformation or eventual destruction of the part which is undergoing testing. For large testing specimens or specimens constructed of costly materials, it is expensive to use destructive testing methods to investigate defective or compromised components. By way of example and not limitation, destructive testing of airplanes necessitates the eventual damage of the aircraft. To perform destructive testing on any one part of the aircraft would require the part being tested to be replaced or heavily repaired, incurring heavy expenses. Even if the tested specimen was initially functional, destructive testing methods by nature destroy the specimen to discover functionality, thus creating the need to manufacture additional, costly aircraft or aircraft parts to replace the damaged specimen. The destructive testing process further requires extensive labor hours, as both testing and replacement require a significant amount of time to conduct. Thus, a need arises for nondestructive testing methods that do not damage the specimen undergoing inspection and are conducted quickly.

The nondestructive testing (NDT) of machinery conducts inspections of a specimen in such a way that the specimen is not damaged in the process of testing (i.e., the physical integrity of the specimen is maintained). One common method of non-destructive testing utilizes an immersion tank into which the aircraft component is submerged in order to couple one or more ultrasonic transducers to the surface of the component. However, this process typically requires the part to be moved offsite or removed from a larger structure (e.g., a wing removed from a larger aircraft structure), increasing time needed to test the part and risking potential damage to the part during part removal, handling, transit, and reinstallation. Outside of an immersion tank, scanning components while they are still attached to larger structures presents geometric and logistical difficulties. One way of addressing these difficulties is accomplished through the use of a robotic arm, which are able to attach to one or more different types of end effectors (e.g., ultrasonic transducer, eddy current probe, thermographic scanner, radiographic scanner, etc.) to perform a variety of tests to determine the integrity of certain components and/or the specimen as a whole. Advantageous, the robotic arm is able to attached the end effectors that provide capabilities beyond simple inspection, including components that release couplant for facilitating a scan, or for end effectors that assist in repair. Nondestructive testing can be completed more cost effectively in comparison to destructive testing methods, as testing can be done without damaging the specimen. It is an advantage of nondestructive testing methods that the specimen or a component of the specimen undergoing inspection is not damaged or destroyed and therefore does not require repair or replacement.

Using robotic arms to scan large components is advantageous over immersion testing, as nondestructive testing can be performed on-site, in a manufacturing or in-service environment (e.g., in the case of an airplane, inspection can be performed at the location of the airplane rather than requiring transportation of the airplane to a testing facility). This facilitates a shortened timeline for nondestructive testing, as the testing does not require movement of a specimen to a secondary testing location, or in some cases, not even removal of a specimen from a larger structure. By reducing the time necessary to test specimens, nondestructive testing methods therefore advantageously advance the timeline of factory production of specimens (e.g. automotive testing and safety evaluations are completed more concisely by nondestructive testing than extensive destructive testing in order to begin mass production of automotive parts sooner). However, setting up a stable robotic arm scanning mechanism is often time-consuming and thus much nondestructive testing using robotic arms is either done during manufacturing on an assembly line (as opposed to after the part is already in use), or the component is transported to a site with robotic arms already set up, obviating a key advantage in non-immersion testing. Thus, a system is needed for quickly deploying robotic arms such that components are able to be quickly scanned on-site and not transported to separate nondestructive testing facilities.

Nondestructive testing is performed through the use of a variety of robotic arms and different end effectors. Nondestructive testing methods include but are not limited to Ultrasonic Nondestructive Testing (UT), Radiography Nondestructive Testing (RT), Thermographic Nondestructive Testing, Magnetic Particle Nondestructive Testing (MT), and Eddy Current Nondestructive Testing (ET). A robotic arm capable of conducting these tests requires a stable mount, base, or other means to allow movement of the robotic arm without destabilizing the structure and causing the arm to fall when in motion.

Current methods of mounting a robotic arm include systems with wheeled bases. For example, the bases described in U.S. Pat. No. 7,859,749 and US Patent Pub. No. 2021/0347060 roll across a surface to be positioned for testing and/or movement of a robotic arm. These wheeled bases are unstable in that they are prone to movement and could affect the integrity of the affixed testing system if they are moved while conducting a nondestructive test on a specimen. It is necessary for nondestructive testing that the mount or base of the robotic arm be immobilized in order to ensure fidelity of the testing process. However, these bases have no means of becoming immobile and secured in position to prevent movement (i.e., suction cups). Because robotic arms are often relatively lengthy and contain a weight at their end (i.e., the end effector), wheeled bases also face a high risk of tipping over as only the only counterweight in the wheel base is the weight of the base itself. Thus, it is an advantage of the present invention to provide a robotic arm mount that can be securely attached and quickly unattached on a variety of surfaces through the use of suction cups in order to provide increased stability for the robotic arm mount in comparison to wheeled bases systems. It is further advantageous that the mount of the present invention is quickly packed and moved by collapsing the extensions into the base of the mounting system, thus providing for increased stability and rapid deployability of the robotic arm mount in comparison to prior art systems.

Additionally, the robotic arms of US Patent Pub No. 2021/0347060 and U.S. Pat. No. 9,408,452 are not used for NDT. The robotic arm of the '060 publication manipulates objects within an environment using pick-and-place automation, and the robotic arm of the '452 patent is used to track a moving brush while drying a user's hair. Neither are used to test the integrity of specimens using NDT methods. Further, the '452 patent fails to disclose the use of a depth camera for calculated movement of the robotic arm with consideration to the depth of the environment in which the robotic arm is located. The present invention advantageously includes the use of a depth camera attached to a section of the robotic arm (e.g., to the end effector) to measure distances between the end effector and the test object to evaluate the range of motion for the robotic arm.

In some prior art cases, the robotic arm is fixed on a single point of the specimen using vacuum suction methods or clamps. For example, U.S. Pat. No. 9,950,813 requires a robotic arm be moved into a specific position on the surface of a specimen for testing before being adhered to the testing surface itself via suction cups. The '813 patent is not all encompassing (i.e., does not include the pulser/receiver as part of a base for the robotic arm). Rather, the pulser/receiver unit of '813 is incorporated into the computer system command connected to the robotic arm via cable. The system of the present invention is advantageously all encompassing (i.e., incorporates the pulser/receiver or other function generator and other necessary hardware components into the robotic arm mount) to allow for a compact system that is convenient for quick setup and on-site testing. Further, the '813 patent does not include a detachable base, or extremities extending from such a base, limiting the ability of the base to serve as an effective counterweight for longer robotic arms or robotic arms with heavier end effectors. Further still, the '813 patent fails to disclose the ability to both scan and repair test objects, where the present invention is advantageously equipped for maintenance and repair of test specimens.

Similarly, U.S. Pat. No. 11,300,477 describes the use of clamp fastened to a specimen in order to perform nondestructive testing of the specimen. This clamp is only designed to fit specific types of objects (e.g., an airfoil) and specific size ranges of objects. Therefore, the apparatus shown in the '477 patent is not able to be adapted to scan, for example, engines, the underside of a plane, tail wings, or any other non-airfoil shaped components. This type of mounting system requires the base of the robotic arm to contact the specimen which is being tested, therefore limiting the range of the testing area of the robotic arm (i.e., the arm must be repositioned to scan the area of the specimen to which the arm is attached). Further, the use of these clamps and vacuum suction potentially cause unintended physical, cosmetic, and/or other forms of damage to the specimen in the process of attachment and unattachment to the specimen itself. It is an advantage of the mounting system of the present invention that the mount does not contact the specimen undergoing testing, thus ensuring no accidental damage is done to the specimen.

The mounting systems described in U.S. Pat. Nos. 9,950,813, 9,408,452, and 11,300,477 have permanent mount bases that are difficult to position in such a way that testing may be conducted, as movement of the mount base requires movement of the entire robotic arm system that is attached. The entire robotic arm of prior art systems must be positioned in such a way that the suction cups or clamps attached to the robotic arm seal the robotic arm to the specimen. It is a significant advantage of the present invention to provide a mount for a robotic arm that may be positioned and secured before the attachment of a robotic arm to ensure minimal risk of damage to the specimen or robotic arm in setting up the testing system. Additionally, the mount of the present invention is placed and secured before attachment of a robotic testing arm to ensure proper placement of the robotic arm system without the need to unattach the entire robotic arm and readjust the positioning of the entire system, as is required in systems such as those described in US Patent Pub. No. 2021/0387834, U.S. Pat. Nos. 9,950,813, and 9,408,452.

Further, the gantry systems of U.S. Pat. No. 11,300,477 and US Patent Pub. No. 20210387834 are limited as to the area of inspection. The system requires movement of the mount system along a test specimen in order to inspect the entire specimen. The robotic arm and robotic arm mount of the present invention advantageously create a spherical area of movement for the robotic arm, allowing the arm to scan above and below in contrast with gantry systems that are generally only able to scan below. Thus, the mount of the present invention does not require constant repositioning in order to scan the entire length of the specimen.

It is a further advantage of the present invention to provide a compact, highly portable mount in which the robotic arm may be fixed. Prior art describes mounting systems that are incapable of collapsing into a portable configuration. For example, U.S. Pat. No. 10,955,310 includes an extensive surface mounting systems which adheres to the surface of a specimen and provides a track for movement of an attached robotic component. However, this track expands lengthwise down a significant portion of a specimen and is incapable of collapsing or folding into a compact configuration for convenient transportation. Thus, it is an advantage of the present invention to provide a base for mounting a robotic arm that is collapsible and highly portable. This is done through the use of retractable extensions, a base configured to mount the robotic arm, and suctions cups designed to seal the retractable legs to a surface and therefore stabilize the robotic arm mount. The present invention uses a system of retractable legs which fold into the mount for a compact configuration of the mount system. This allows the mount to be readily portable for easy deployment in a variety of environments. For example, if a piece of equipment in an oil refinery needs urgent inspection, the specimen is not able to be moved for testing and the extensive track mount systems of prior art are unable to be maneuvered into a position conducive to testing. However, the robotic arm mount of the present invention is easily moved to the location requiring inspection and secured in place.

Referring now to the drawings in general, the illustrations are for the purpose of describing one or more preferred embodiments of the invention and are not intended to limit the invention thereto.

The present invention provides a robotic arm mount system for performing non-destructive testing, repair, or other servicing on equipment, preferably in a manufacturing or in-service environment. Applications of the present invention include, but are not limited to, wind turbine blades, which are able to be scanned without removing the blades from the turbine structure. Other examples include, but are not limited to, automotive parts, during manufacturing or after they are in service, or aerospace components.

FIG. 1 illustrates one embodiment of the present invention. A robotic arm mount system 100 includes retractable legs 102 which are fully compacted and folded into the mount 101. The robotic arm mount 100 comprises a solid mount 101 with legs 102, wherein the legs 102 fit evenly and snugly into recesses 110 in the side walls of the solid mount 101 when folded so the overall surface of the side of the compacted mount is even. It is an advantage that the exterior side walls of the surface of the robotic arm mount system 100 are level when compacted, as any protrusions may cause damage to the robotic arm mount system 100 in transit (i.e., if the legs 102 protrude when compacted, they may be pushed against other materials during transportation and become worn or warped).

In a preferred embodiment, the robotic arm mount system 100 includes four legs 102, as in the embodiment shown in FIG. 1. However, one of ordinary skill in the art will understand that the number of legs 102 of the robotic arm mount system 100 is not intended to be limiting, and the robotic arm mount system is able to include two legs, three legs, five legs, or any greater number of legs. Furthermore, although FIG. 1 shows a single leg 102 within a single recess on a side wall of the solid mount 101, one of ordinary skill in the art will understand that each side wall is able to include any number of legs 102 and corresponding recesses 110 for receiving each of those legs. By way of example and not limitation, in one embodiment, each side wall of the solid mount 101 includes two legs 102 and two corresponding recesses 110.

In one embodiment, the robotic arm mount system is an upright square prism or similar geometric shape (e.g., cube, pentagonal prism, triangular prism) with retractable legs 102 each located upright along the center of a lateral face of the robotic arm mount system. This is advantageous in providing stability for the base, as each leg 102 is located approximately equidistant from a theoretical center point of the solid mount 101. Further, the regular, geometric shape of the present invention is advantageous for storage and portability, as the compacted mount easily fits alongside other containers without the need for rearranging to accommodate an awkwardly shaped item (i.e., the shape of a mount with legs that are not able to fold into the mount). However, one of ordinary skill in the art will understand that the shape of the solid mount 101 is not intended to be limiting. Furthermore, in another embodiment, each leg 102 is not approximately equidistant from a theoretical center point of the solid mount 101.

In one embodiment, in a compacted state, the robotic arm mount system 100 is readily deployable and fits conveniently in a car, airplane hold, or other method of storage transportation method. In one embodiment, the robotic arm mount system 100 is stored on site at a variety of locations where nondestructive testing may be required (e.g., aircraft hangars, water treatment plants) for convenient access and deployment. When required for nondestructive testing of a specimen, the robotic arm mount system 100 is quickly and easily placed near the location of the specimen. The process of adjusting the location and position of the robotic arm mount system 100 is accomplished without requiring the repositioning of an entire robotic arm testing system 100, which is a significant advantage of the present invention over traditional robotic arm testing systems. Setup of a robotic arm for nondestructive testing of a specimen can be accomplished more rapidly through the use of the robotic arm mount system 100 of the present invention.

In one embodiment, a top surface of the robotic arm mount system 100 includes at least one handle for ease in lifting and relocating the robotic arm mount system to a new location.

Figure 2A:
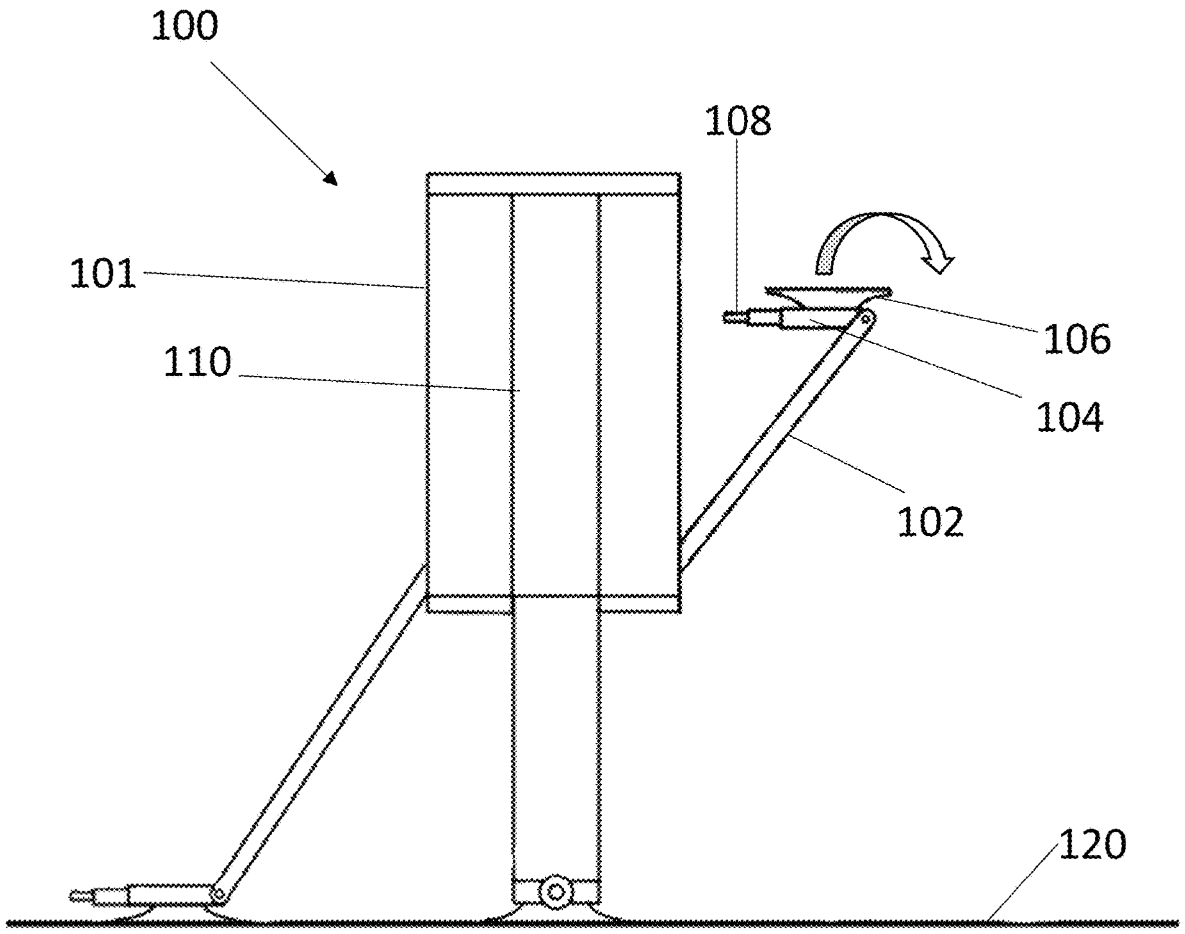
FIG. 2A illustrates a side orthogonal view of a foldable robotic arm mount with one leg in the process of unfolding according to one embodiment of the present invention.
Figure 2B:
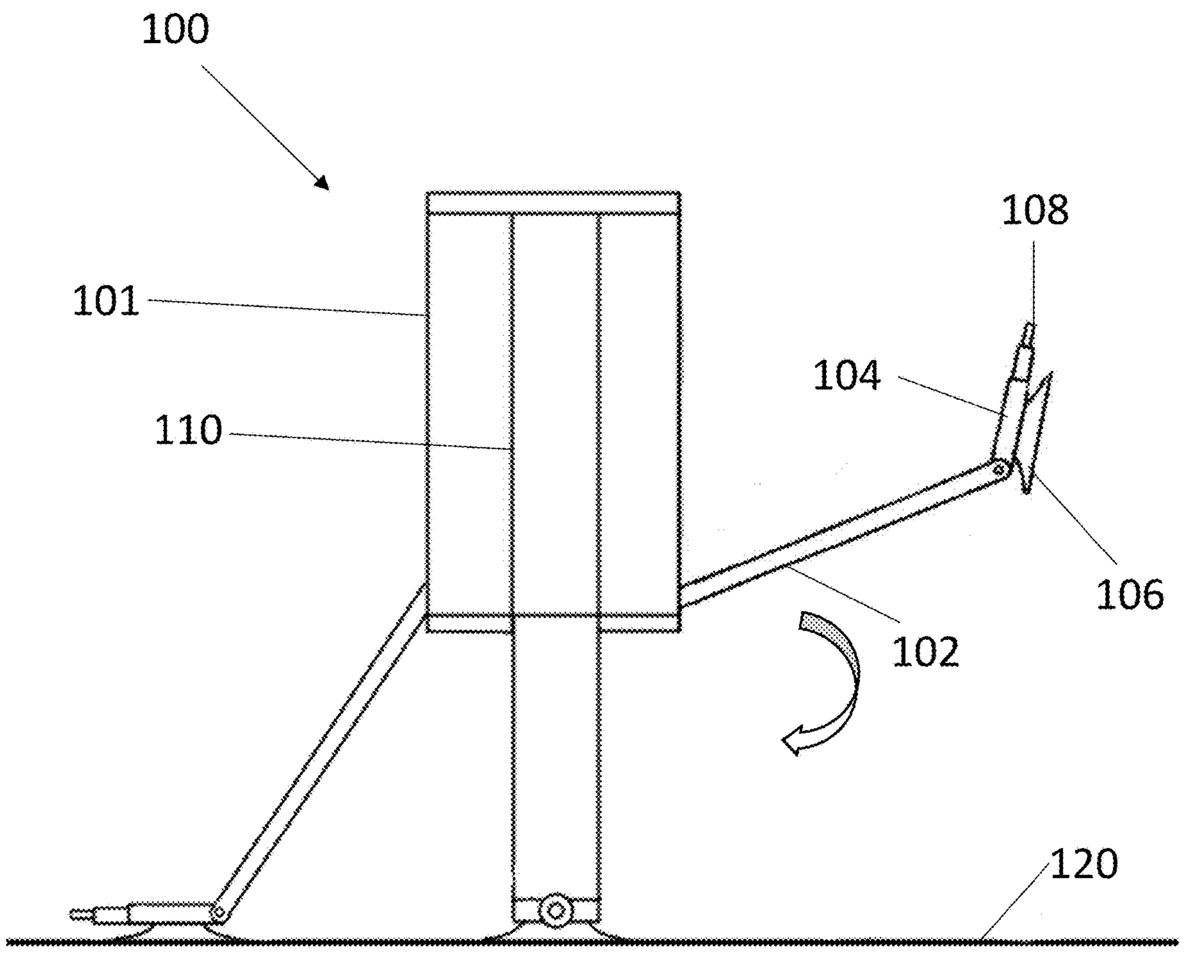
FIG. 2B illustrates a side orthogonal view of a foldable robotic arm mount with one leg in the process of unfolding according to one embodiment of the present invention.
Figure 2C:
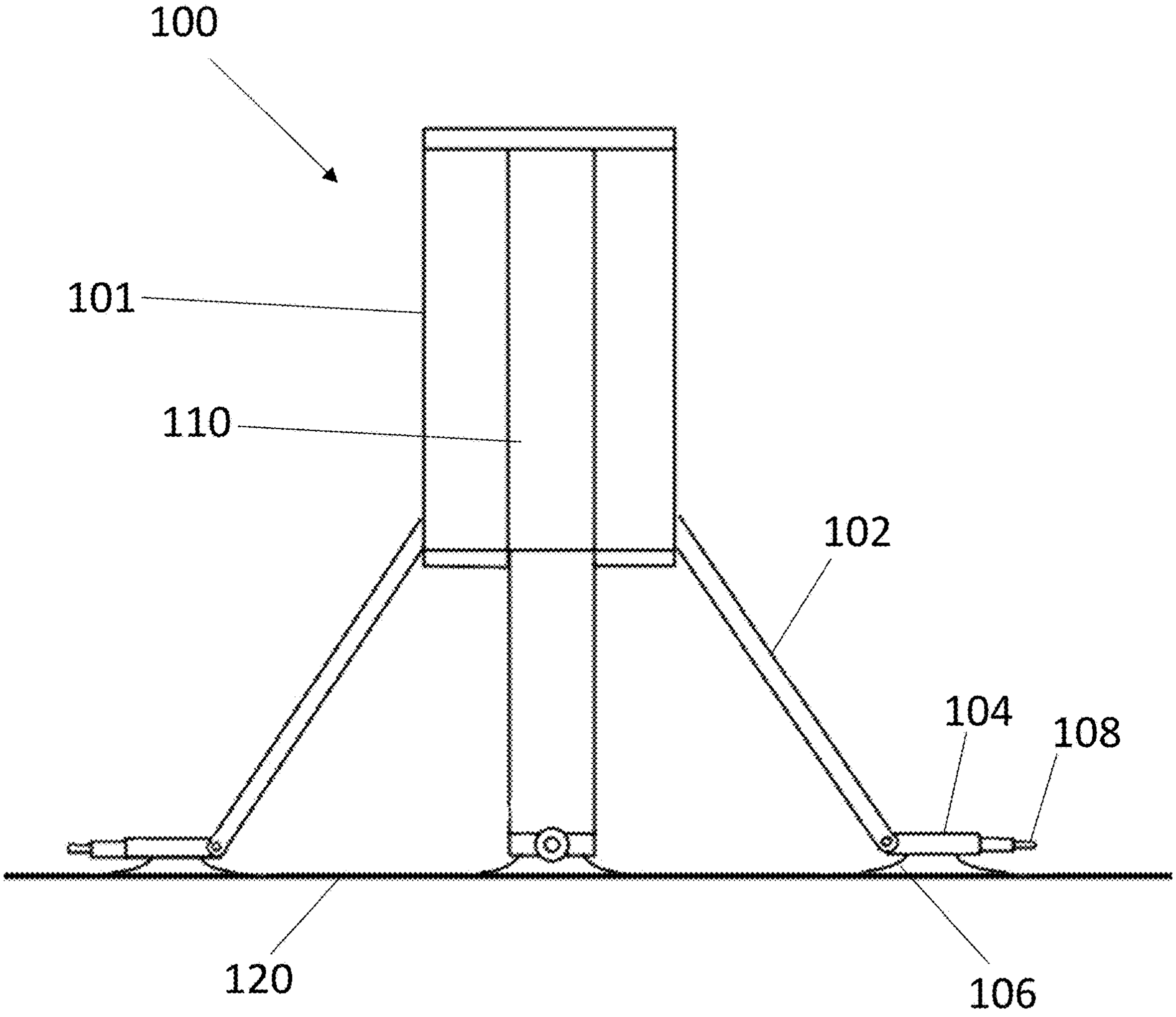
FIG. 2C illustrates a side orthogonal view of a foldable robotic arm mount in a fully unfolded position according to one embodiment of the present invention.

FIGS. 2A-2C illustrate the deployment of an extendable leg of robotic arm mount system 100 wherein three of four retractable legs have been deployed. In one embodiment, retractable legs 102 are a fixed length. In one embodiment, the legs are telescopic, allowing for reasonable adjustment of height and distance to the ground (i.e., in cases where the ground is unlevel).

FIG. 2A depicts a robotic arm mount system 100 comprising a mount 101 and a plurality of retractable legs 102. The legs 102 are attached to the base 101 via a joint at a first end of the leg 102. A second end of the leg 102 connects to a foot 104. In one embodiment, the leg 102 is pivotably attached to the foot 104 via a hinge joint or any other joint known to the art that allows the foot to pivot and move according to the description of the present invention. A suction cup 106 is attached to the foot 104 in such a way that when the leg 102 with the foot 104 is folded, the suction cup 106 does not contact the leg 102. The suction cup 106 further includes an actuator 108 for easy attachment and unattachment of the suction cup 106 to a surface. In one embodiment, when in a folded position, the suction cup 106 secures the folded legs 102 to the mount 101 to prevent the legs 102 from unintentionally deploying from a compact configuration. As each leg 102 unfolds from recess 110 of base 101, the foot 104 pivots around the leg 102 at the hinge joint so the suction cup 106 faces and attaches to the ground or other surface 120, as shown from the progression from FIG. 2A to FIG. 2C.

In one embodiment, the retractable legs 102 are manually deployed. In another embodiment, the robotic arm mount system 100 of the present invention is in wireless connection with at least one electronic device including at least a processor and a memory, such as a server, blade server, mainframe, mobile phone, personal digital assistant (PDA), smartphone, desktop computer, netbook computer, tablet computer, workstation, laptop, and other similar computing devices. In one embodiment, the retractable legs 102 are configured to unfold automatically through a wireless remote connection. In one embodiment, the legs 102 are simultaneously deployed via wireless remote connection. In one embodiment, the legs 102 are sequentially deployed via wireless remote connection in a sequence that maintains sufficient stability of the mount (e.g., legs on opposite sides of a rectangular prism are deployed simultaneously at a first time, and the remaining compacted legs on opposite sides are deployed simultaneously at a second time; or three legs of a pentagonal prism forming a theoretical isosceles triangle are deployed simultaneously at a first time, and the two remaining compacted legs are deployed sequentially at a second time). Preferably, when deployed, a central axis of each of the legs 102 is not substantially orthogonal to the ground. In one embodiment, when deployed, a central axis of each of the legs 102 is at an angle of approximately 35° relative to the ground. In one embodiment, when deployed, a central axis of each of the legs 102 is at an angle between approximately 15° and approximately 45° relative to the ground. In one embodiment, the at least one electronic device, including a wireless receiver, is operable to receive a selection of legs to automatically deploy. In one embodiment, the wireless remote connection is used to send signals to one or more driver motors operable to move the legs 102 between a retracted and an extended position and/or able to activate one or more pneumatic actuators operable to move the legs 102 between a retracted and an extended position.

In one embodiment, the suction cups 106 are affixed to feet 104 in such a way that the distance from the suction cup 106 to the ground 120 is adjustable. In one embodiment, the suction cups 106 are able to be adjusted so that the solid mount 101 is stabilized in an upright position on a surface, even if that surface is not level (i.e., the height of the suction cup is adjusted either at the foot 104 or at the leg 102 so a sealed connection is made between the suction cup 106 and the ground 120 to stabilize the mount system). The robotic arm mount system 100 of the present application is advantageous for use on locations with unlevel ground where a mount with wheels is likely to encounter significant difficulties (e.g., a robotic arm mount with wheels on unlevel ground is moved by gravity, affecting the security and stability of the robotic arm). It is a distinct advantage of the present invention to employ a suction cup system for adherence to a surface that is uneven. For example, the mount is affixed on the ground of an airplane hangar that is not level in order to perform testing on a plane. The mount will not slide, roll, or otherwise move out of the position in which it has been attached to the floor of the hangar. Furthermore, preferably, a top surface of the solid mount 101, which interacts and connects with the robotic arm, is substantially horizontal, even if the ground is not substantially horizontal in that area. Therefore, nondestructive testing can be completed without compromising the integrity of the nondestructive test through accidental or unintended movement of the robotic arm mount.

In one embodiment, the feet 104 are pivotably connected to the ends of the legs 102, such that they are able to rotate and a central axis of the feet relative to a central axis of the legs adjusts when moving between a storage position and a deployed position. In one embodiment, in a deployed position, the feet 104 are neither parallel to nor orthogonal to the legs 102, but at an angle. Preferably, in the deployed position, the feet 104 are substantially parallel to a surface to which the system 100 is attached. In a storage position, a central axis of the feet 104 are preferably substantially parallel to a central axis of the legs 102. Preferably, in the storage position, the feet 104 are positioned between the legs 102 and the solid mount 101. In one embodiment, the recesses 110 are thus configured to be deeper at a top portion to accommodate the feet 104 in the storage position while still providing for an outside surface of the legs 102 to be flush with the sides of the solid mount 101 in the storage position.

In one embodiment, the mount system is attached to a mobile platform, including, but not limited to, an unmanned ground vehicle (UGV), a mobile robot, a heavy crawler, a moveable anchoring platform, a scissor-lift platform, and/or any other type of raised or moveable platform used in a factory or manufacturing setting. This system allows the mount, and therefore the robotic arm, to remain fixed and stable while moving the system as a whole to scan new areas, reducing time to move the system, allowing for access to potentially harder to reach areas, and increasing the speed at which inspection, maintenance, or other treatment of the test object is able to be performed.

In one embodiment, the suction cups 106 of the present invention further include an actuator 108 for easy attachment and unattachment of the suction cup to a surface. One of ordinary skill in the art will appreciate that many suction cup actuators are known to the art. The actuator 108 of the present invention is able to be a lever, a button, a clamp, or any other suction actuator known to the art. When engaged, the actuator 108 creates a vacuum seal between the suction cup and the ground (e.g., causes air to effuse from the space between the suction cup 106 and the ground), establishing a secure attachment and preventing movement of the legs and mount. When disengaged, actuator relieves the vacuum seal between the suction cup and the ground (e.g., allows air to enter the space between the suction cup 106 and the ground), allowing the foot 104 and leg 102 to be lifted from the ground. In one embodiment, the suction cup actuator 108 is manually engaged. In another embodiment, the actuator 108 is configured to engage or disengage the suction cups 106 automatically through a wireless remote connection (e.g., a wireless signal causes a valve to automatically open or close).

In one embodiment, one or more of the suction cups 106 are attached to at least one vacuum pump via tubing. The at least one vacuum pump is operable to actively evacuate air between each attached suction cup 106 and the surface to which the suction cups 106 are attached. This allows a vacuum to be maintained and, therefore, the suction cups 106 to remain stuck to the surface without risk of the system collapsing and damaging people, equipment, or the part being inspected. An active suction cup system is particularly useful in situations where the surface to which the device is attached is uneven, which makes maintaining a vacuum with a passive system more difficult.

In one embodiment, in addition to or in alternative to the suction cups 106, the robotic arm mount system 100 includes one or more magnetic feet for stabilization. The magnetic feet are particularly suitable for attaching the robotic arm mount system 100 to a ferromagnetic surface, such as a storage tank, and allow the system to be mounted both vertically and horizontally. Examples of system with magnetic feet suitable to be combined with the present invention include, but are not limited to, those described in U.S. Pat. No. 9,533,724. Other systems for stabilization that are able to be used in addition to, or alternatively to, suction cups or magnetic feet include, but are not limited to, fillable fluid bladders attached to each foot that provide additional stabilization weight and/or other weights attached to each leg.

In one embodiment, the at least one electronic device is operable to receive a selection of telescopic collapsible legs to adjust after deployment. In one embodiment, the electronic device is configured to display an alert indicating a leg, foot, suction cup, suction cup actuator, or other component of the invention which requires adjustment to enable secure attachment of the robotic arm mount to a surface. For example and not by way of limitation, if the attachment surface is not level and one extendable leg does not connect to the ground, the electronic device receives and/or displays an indication of the specific leg requiring adjustment in order to establish a secure connection between the mount and the attachment surface. In one embodiment, the robotic arm mount system automatically adjusts a leg, foot, suction cup, suction cup actuator, or other component of the invention to enable secure attachment of the robotic arm mount to a surface.

FIG. 2B illustrates a robotic arm mount system 100 comprising mount 101 and a plurality of retractable legs 102. The leg 102 unfolds from recess 110 of mount 101 at the joint connecting the leg 102 to the mount 101. As the leg unfolds, the foot 104 with suction cup 106 continues to pivot in such a way that contact with the ground 120 will enable actuator 108 to create an effective vacuum.

FIG. 2C illustrates a robotic arm mount system 100 comprising mount 101, or base, and a plurality of retractable legs 102, wherein leg 102 unfolds from recess 110 of mount 101. The leg 102 is attached at one end to the mount 101 in such a way that the leg pivots out and unfolds to allow foot 104 to be parallel to the ground 120 and suction cup 106 affixed to the foot contacts the ground. When suction cup 106 contacts the ground 120, suction actuator 108 engages the vacuum seal between the suction cup and the ground in order to secure the robotic arm mounting system 100 to the ground.

Figure 3:
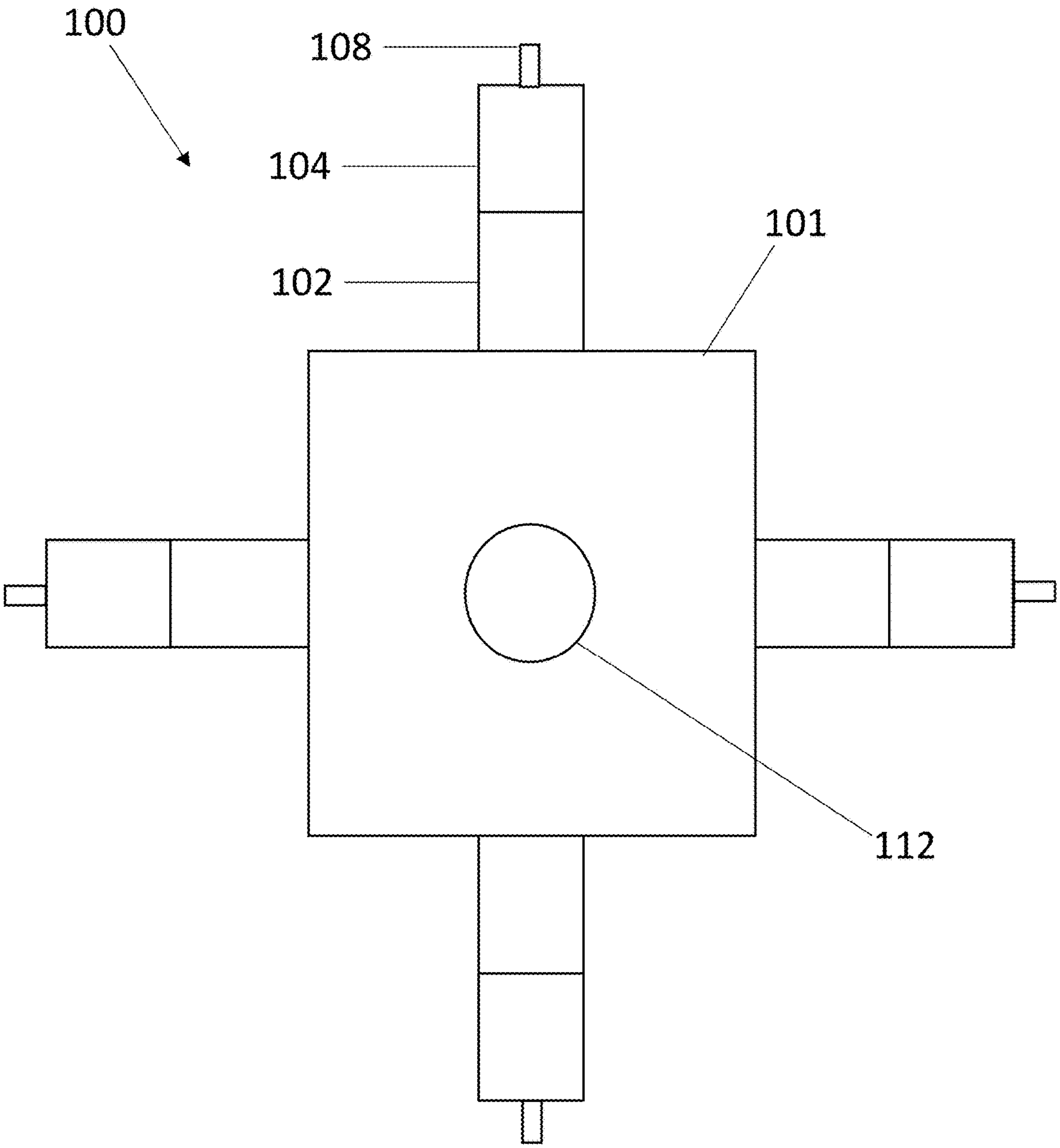
FIG. 3 illustrates a top orthogonal view of a foldable robotic arm mount according to one embodiment of the present invention.

FIG. 3 is an orthogonal view of the top of the mount system 100 when all legs are deployed. Each leg 102 attaches to the mount 101 at one end and foot 104 at the other end, with a suction cup actuator 108 extending outwardly from the foot 104. The mount 101 defines a cavity 112 into which a robotic arm is placed. In one embodiment, the robotic arm is secured in place via a locking mechanism upon insertion of the arm or insertion of a portion of the arm into the cavity 112.

One of ordinary skill in the art will understand the methods and structure necessitated by a locking mechanism, for example a twist and lock system or similar locking mechanism. In one embodiment, the robotic arm is inserted into the cavity of the mount and rotated a number of degrees after which point a locking mechanism secures the robotic arm in place. In one embodiment, the robotic arm must be rotated in an opposite direction a number of degrees in order to disengage the locking mechanism and remove the robotic arm. In one embodiment, the robotic arm is inserted into the cavity of the mount and a locking mechanism automatically secures the robotic arm in place without requiring rotation of the robotic arm. In one embodiment, the lock is manually released by pressing a button, lever, or any other form of locking control. In one embodiment, a lock is automatically released via input from an electronic device.

In one embodiment, the mount 101 includes the inspection card (e.g., the function generator, oscilloscope, random waveform generator, etc.) built in and wired such that, when a robotic arm is inserted, the inspection card automatically hooks up to the robotic arm. In one embodiment, the robotic arm is wired such that, when the robotic arm is attached to the mount 101, the end effector is connected to the robotic arm, and the robotic arm is connected to the inspection card, allowing the mount 101 to automatically operate the end effector.

Figure 4A:
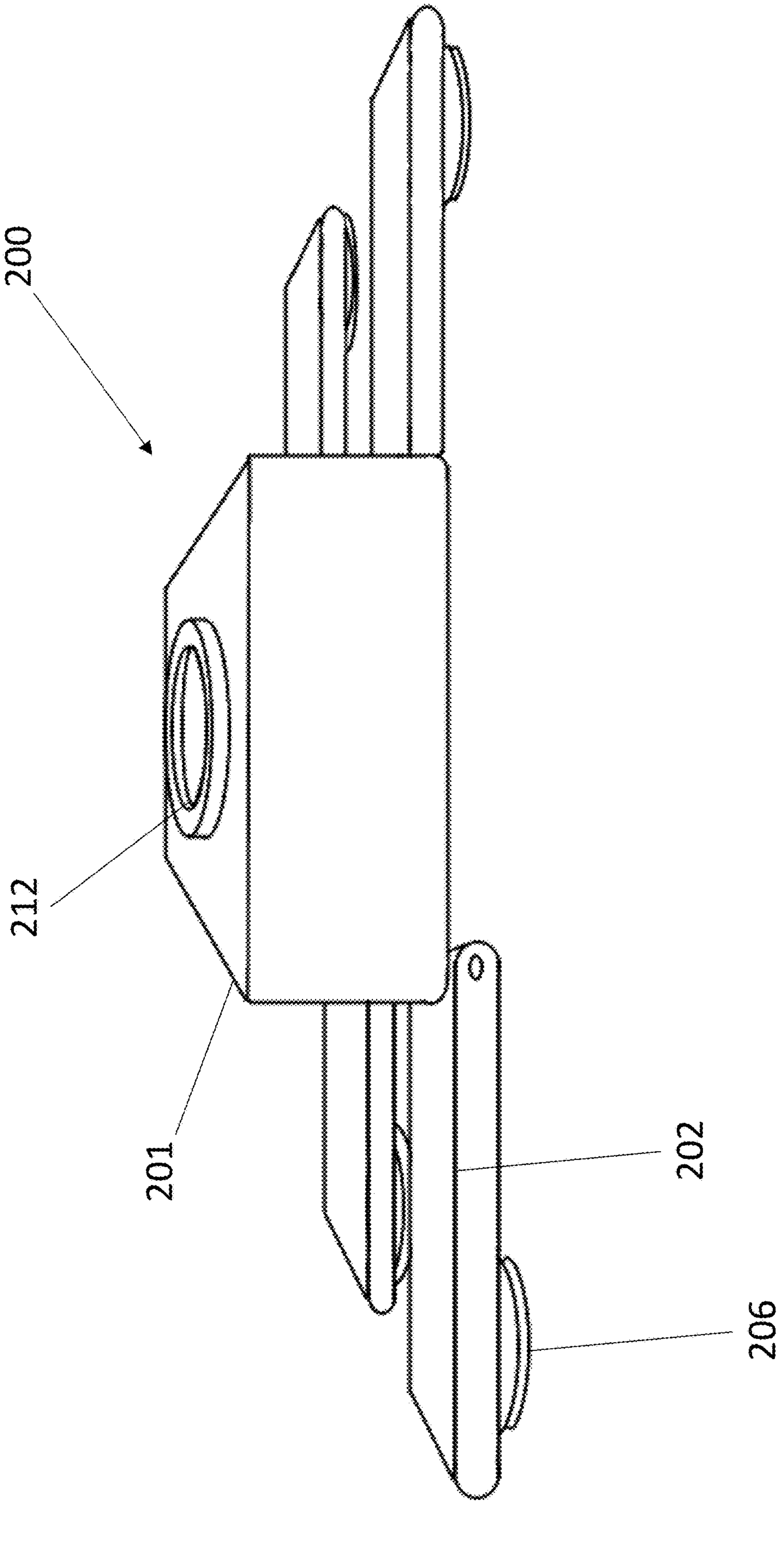
FIG. 4A illustrates an isometric view of a foldable robotic arm mount according to one embodiment of the present invention.

FIG. 4A depicts a second embodiment of the present invention. In this second embodiment, robotic arm mount system 200 comprises a mount 201 stabilized by unfoldable legs 202. The suction cups 206 of robotic arm mount system 200 attach directly to the retractable legs 202 and secure the mount system 200 to the ground. Retractable legs fold outward from two opposite sides of the mount 201 in such a way that two legs extend outwardly from a first side, with two legs extending outwardly from a second, opposite side. The theoretical plane created between the two sides with legs extending outwardly is perpendicularly intersected by the theoretical plane created between two opposite sides with no feet. In one embodiment, legs 202 are a fixed length, folding outwardly from the mount 201. In one embodiment, the legs are telescopic, allowing for reasonable adjustment of height and distance to the ground and minimizing the space required to store the legs when in a retracted configuration.

The mount 201 includes a cavity 212 wherein a robotic arm is attached. In one embodiment, the cavity 212 includes a lip radially surrounding the cavity 212 as depicted in FIG. 4A. In one embodiment, the robotic arm is attached and secured via a locking mechanism. In one embodiment, the robotic arm is secured in place via a locking mechanism upon insertion of the arm or insertion of a portion of the arm into the cavity 212.

Figure 4B:
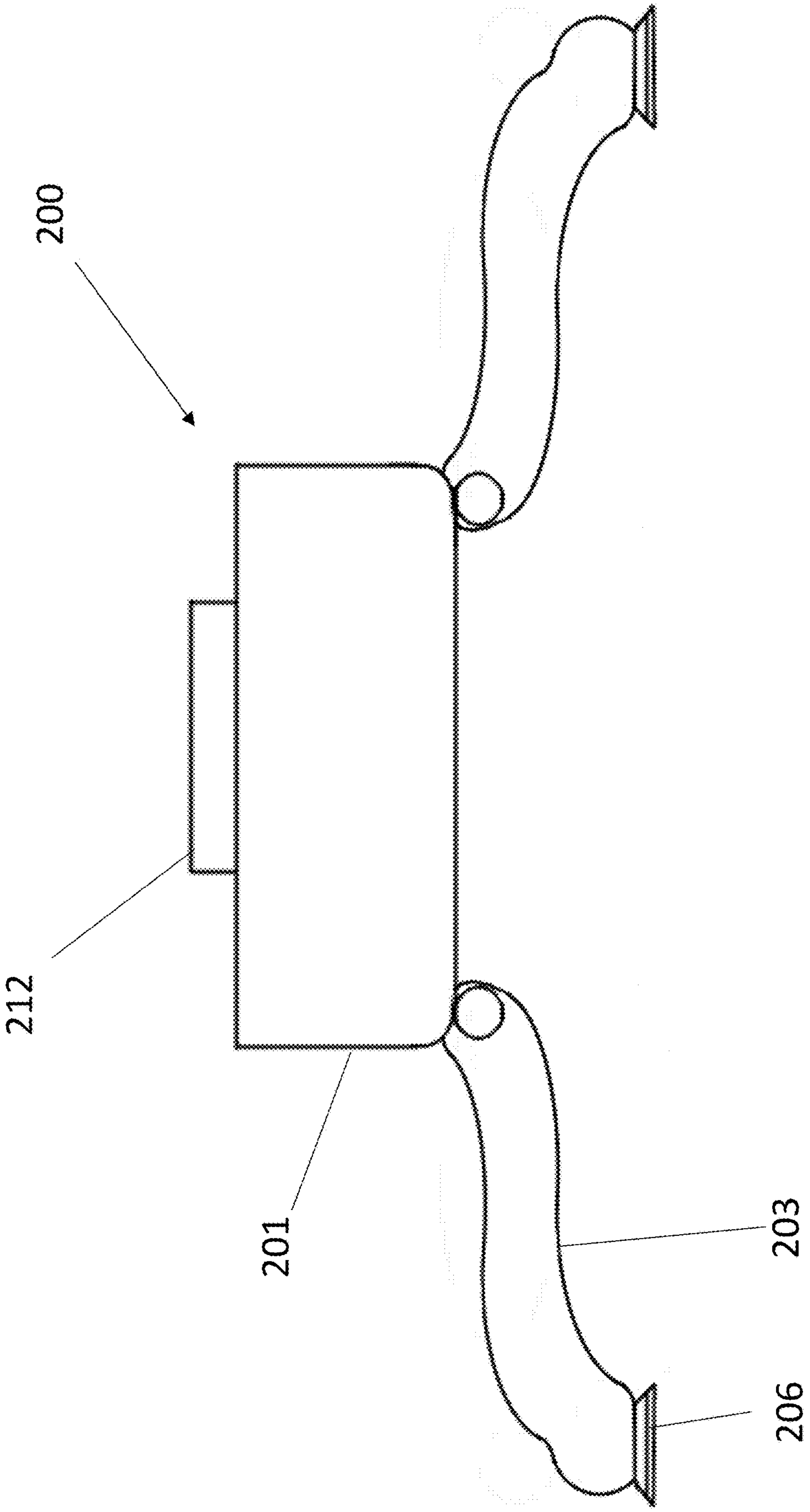
FIG. 4B illustrates a side view of a foldable robotic arm mount including S-shaped legs according to one embodiment of the present invention.
Figure 4C:
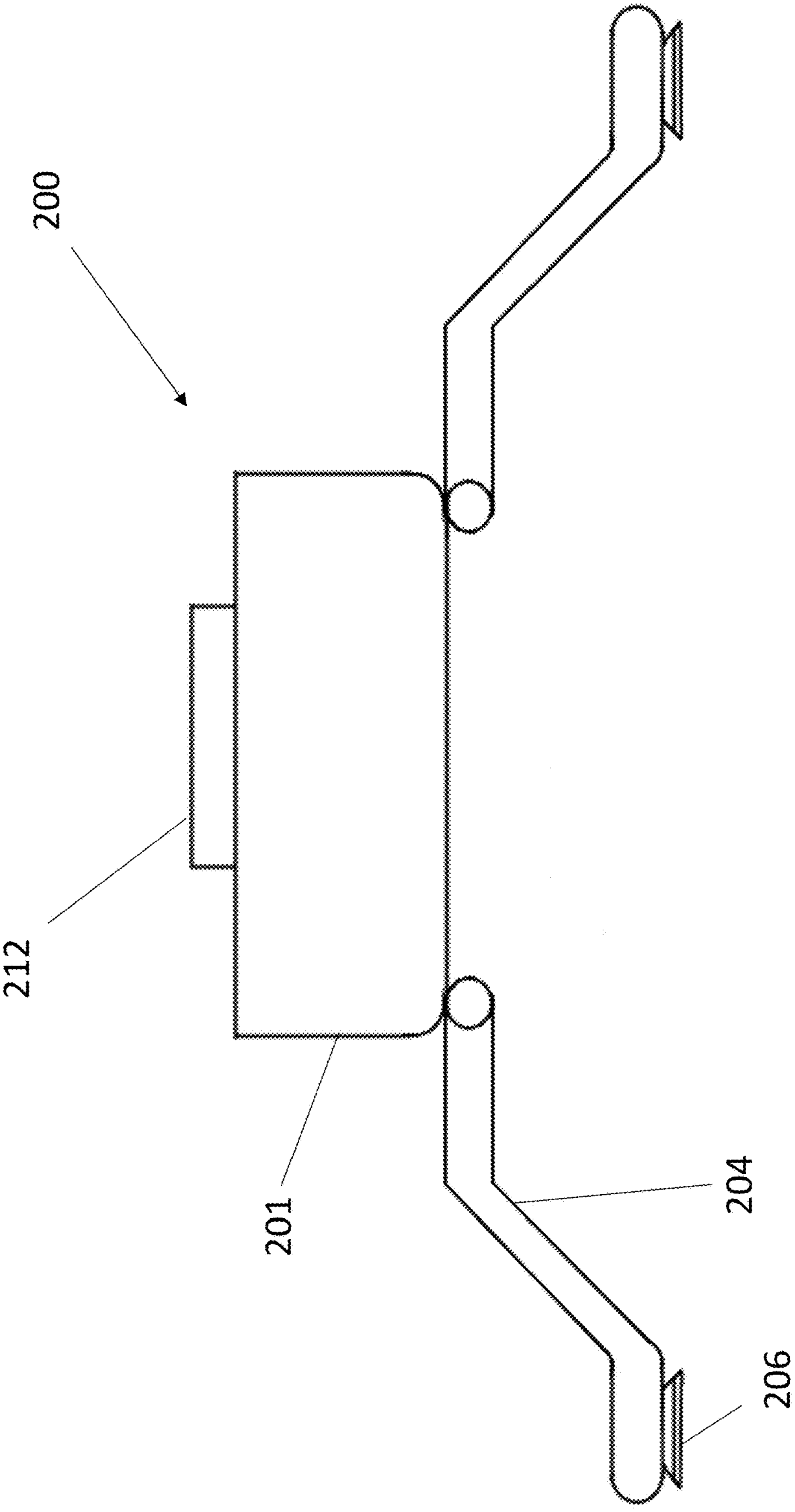
FIG. 4C illustrates a side view of a foldable robotic arm mount including angled legs according to one embodiment of the present invention.

One of ordinary skill in the art will understand that while FIG. 4A depicts the legs 202 of the robotic arm mount system 200 as being substantially flat, otherwise shaped legs, including, but not limited to, S-shaped legs 203 as shown in FIG. 4B or angled legs 204 as shown in FIG. 4C, are also compatible with the present invention. For example, for attaching to a more uneven surface, it is advantageous to utilize a system having a smaller footprint directly around the foot. Otherwise, the flat, straight legs have the potential to block the system from attaching to some structures. In one embodiment, the legs 202 of the robotic arm mount system 200 are attached to the suction cups 206 by a universal joint (U-joint) and/or are attached to the mount 201 by a U-joint.

One of ordinary skill in the art will understand the methods and structure necessitated by a locking mechanism, for example a twist and lock system or similar locking mechanism. In one embodiment, the robotic arm is inserted into the cavity of the mount and rotated a number of degrees after which point a locking mechanism secures the robotic arm in place. In one embodiment, the robotic arm must be rotated in an opposite direction a number of degrees in order to disengage the locking mechanism and remove the robotic arm. In one embodiment, the robotic arm is inserted into the cavity of the mount and a locking mechanism secures the robotic arm in place without requiring rotation of the robotic arm. In one embodiment, the lock is manually released by pressing a button, lever, or any other form of locking control. In one embodiment, a lock is automatically released via input from an electronic device.

In one embodiment, each leg 202 of the robotic arm mount system 200 are able to be locked in any position by at least one locking mechanism attached to each leg 202. In one embodiment, each leg 202 is able to be locked at predefined angles relative to the mount 201 (e.g., every 5 degrees, every 10 degrees, etc.). In one embodiment, one or more wires extend through the mount 201 to each leg 202 and are connected with at least one electronic locking system, wherein application of current from an external power system and/or a battery within the mount 201 causes at least one pin in each leg 202 to lock the position of the corresponding leg 202. In one embodiment, the robotic arm mount system 200 is able to connect with at least one scan interface or repair interface such that a signal is sent to lock each leg in place when a scan is set to begin, ensuring that the system is not unstable while scanning or repairing a part. In one embodiment, at least one biasing member (e.g., a spring) is connected to each of the legs 202. When the legs 202 begin to be unfurled out of a full folded position, the biasing member provides a force to release the legs 202 and move them away from the fully folded position.

Figure 5:
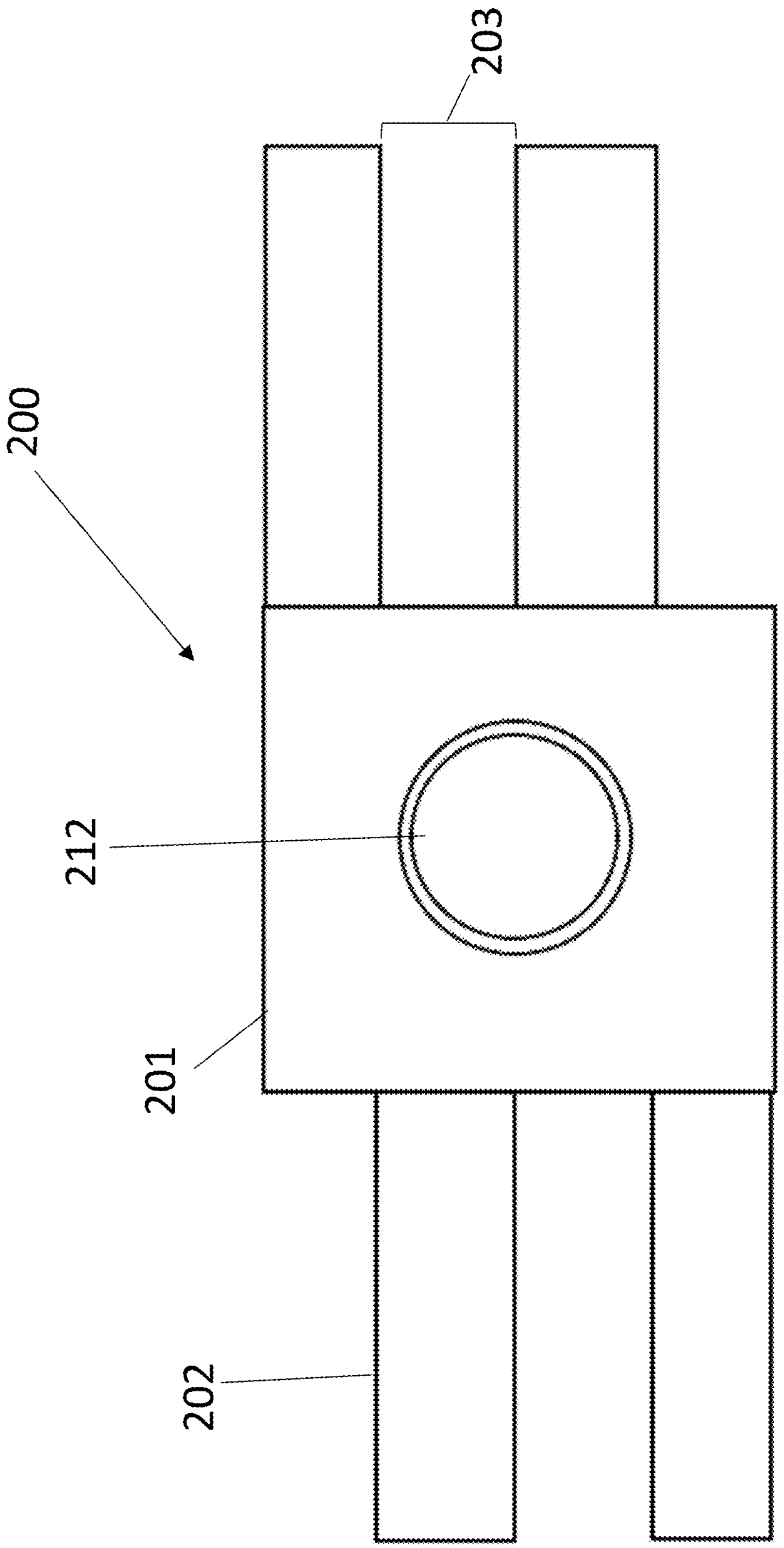
FIG. 5 illustrates a top orthogonal view of a foldable robotic arm mount according to one embodiment of the present invention.

FIG. 5 depicts an orthogonal top view of robotic arm mount system 200. The mount 201 is stabilized by legs 202. The legs 202 extend outwardly from the mount 201. In this embodiment, legs 202 are substantially parallel, with two legs extending outwardly from two opposite sides of the mount. Open space 203 indicates the gap between two legs on a same side of the robotic mount system 200. The legs 202 are spaced in order to allow room for all four legs to be positioned in parallel adjacency when in a folded configuration beneath mount 201 (i.e., when in a folded configuration, the space 203 between two legs on the same side is sufficient to allow the corresponding leg 202 directly opposite open space 203 to nestle when in a folded configuration).

The cavity 212 extends into the mount 201. After the suction cups 206 have been securely attached to the ground, the robotic arm is able to be attached to the mount 201 according to the present invention. The robotic arm is inserted into the cavity 212 and secured. In one embodiment, the robotic arm is secured in place upon insertion of the arm or a portion of the arm into the cavity 212 via a locking mechanism. One of ordinary skill in the art will understand the methods and structure necessitated by a locking mechanism, for example a twist and lock system or similar locking mechanism. In one embodiment, the robotic arm is inserted into the cavity of the mount and rotated a number of degrees after which point a locking mechanism secures the robotic arm in place. In one embodiment, the robotic arm must be rotated in an opposite direction a number of degrees in order to disengage the locking mechanism and remove the robotic arm. In one embodiment, the robotic arm is inserted into the cavity of the mount and a locking mechanism secures the robotic arm in place without requiring rotation of the robotic arm. In one embodiment, the lock is manually released by pressing a button, lever, or any other form of locking control. In one embodiment, a lock is automatically released via an input from an electronic device.

Figure 6:
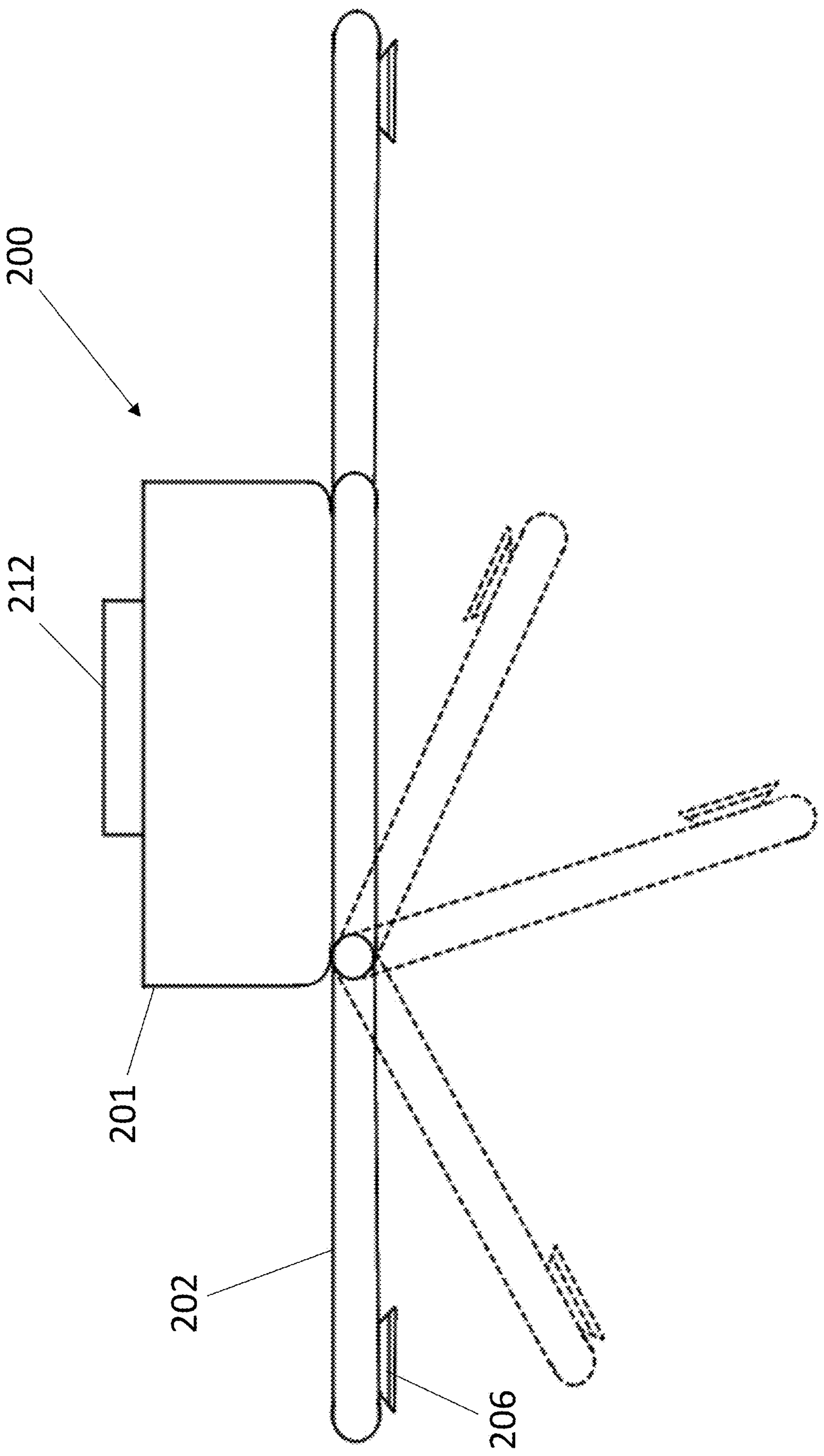
FIG. 6 illustrates a side orthogonal view of a foldable robotic arm mount according to one embodiment of the present invention.

FIG. 6 depicts robotic arm mount system 200. The legs 202 extend outwardly from the mount 201. When compacted, the legs 202 of the robotic mount system 200 fit together beneath the mount 201. To unfold, the legs swing outwardly from a hinge connecting one end of the leg 202 to the base 201. When unfolding from a compact position, the legs hinge and swing, pivot, rotate, or otherwise move outwardly from beneath the mount 201. Two legs swing outwardly from the same side, with an open space between them where a leg from the opposite side is nestled in a compact position. On the opposite side, two additional legs swing outwardly from a hinged joint at the base of mount 201. In this way, four legs swing outwardly from two sides in order to form a stable base for mount 201.

A suction cup 206 is affixed to the other end of the leg 202. In one embodiment, suction cup 206 secures folded legs 202 to mount 201 to prevent the legs from unintentionally deploying from a folded configuration. In one embodiment, cavity 212 includes a lip which extends beyond the flat surface of the mount. This lip is advantageous in securing the robotic arm by a locking mechanism (e.g. a twist lock mechanism).

FIGS. 7A-7E illustrate a third embodiment of the present invention, showing a rolling transportation embodiment of robotic arm mount system 300. A ledge 302 is perpendicular to a mount surface 306 of a robotic arm mount system 300, where an object placed on ledge 302 would rest against mount surface 306 while the rolling transportation embodiment is in motion. In a rolling position, the collapsible legs of the present invention are folded into a configuration flush and parallel to the mounting surface 306.

Figure 7A:
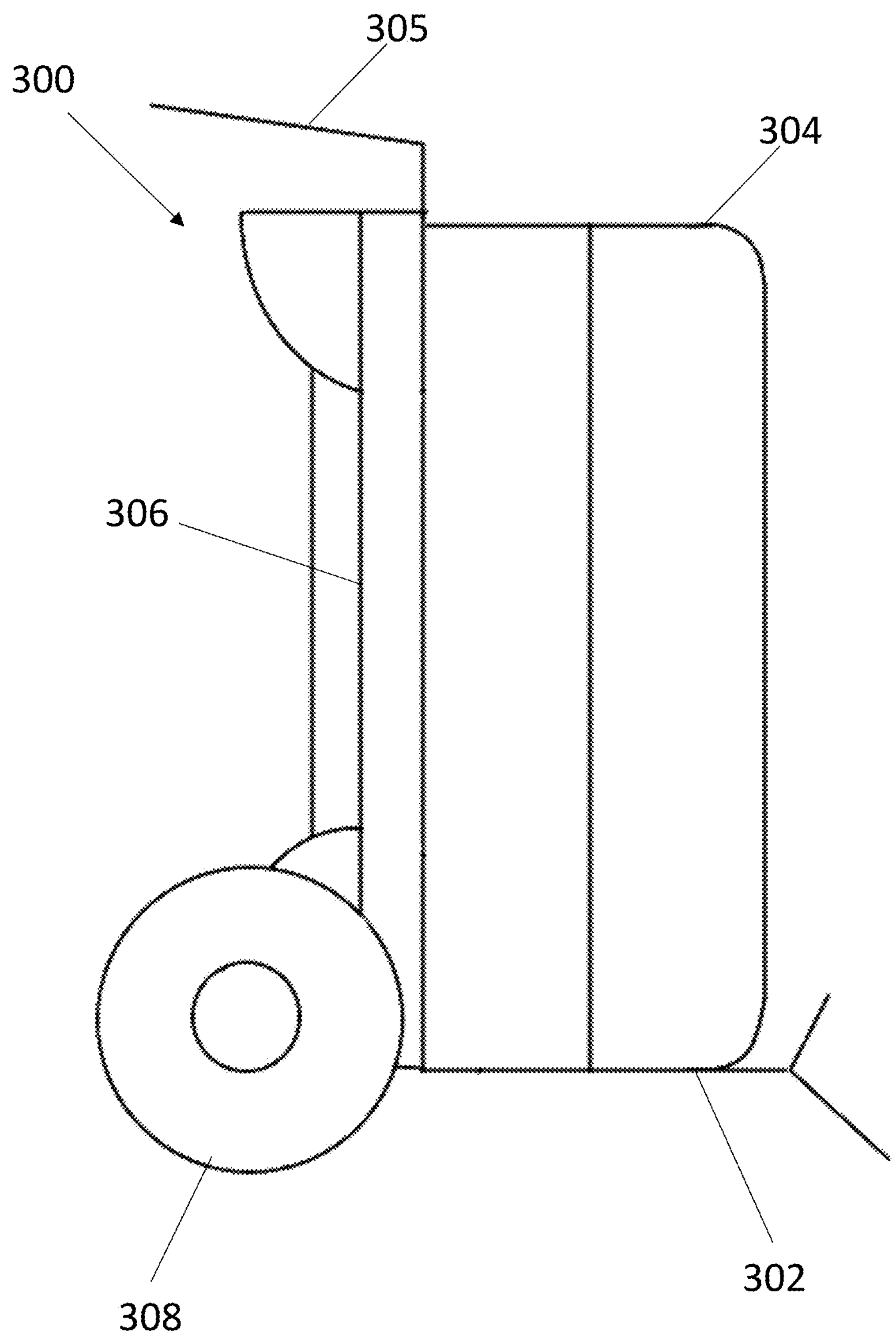
FIG. 7A illustrates a side orthogonal view of a foldable robotic arm mount in the form of a component case carrying device according to one embodiment of the present invention.
Figure 7B:
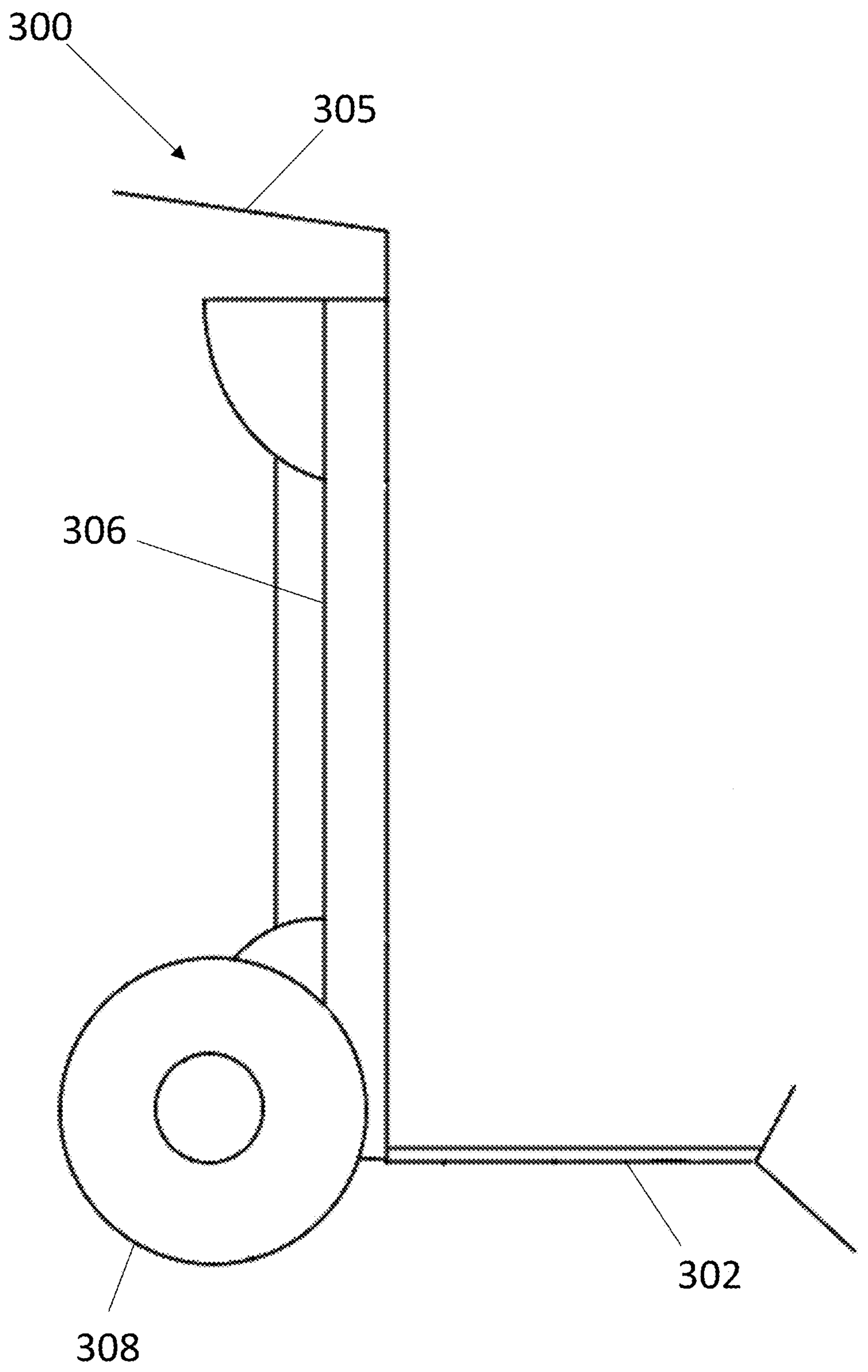
FIG. 7B illustrates a side orthogonal view of the foldable robotic arm mount of FIG. 7A with the component case removed.
Figure 7C:
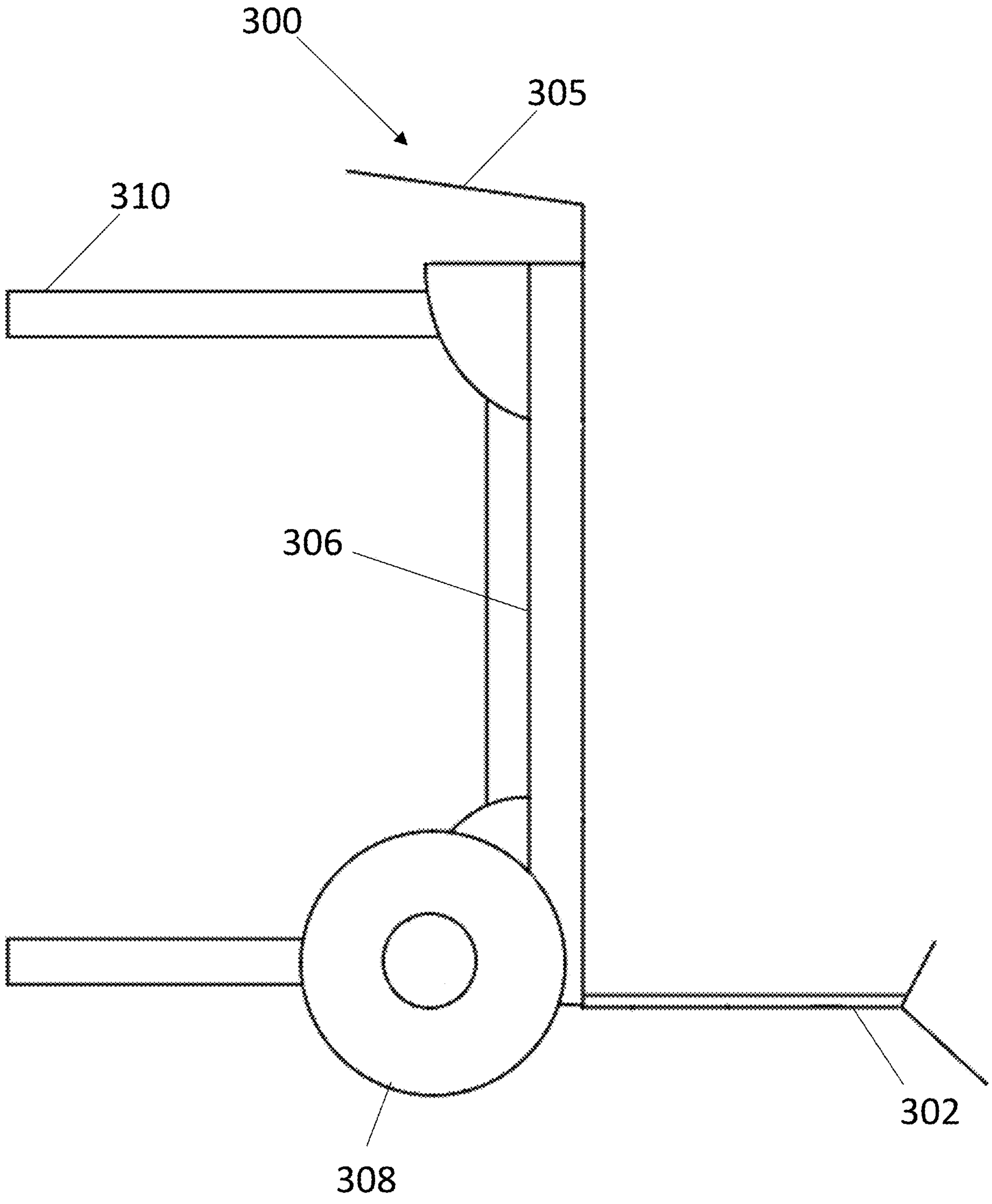
FIG. 7C illustrates a side orthogonal view of the foldable robotic arm mount of FIG. 7B with legs outstretched.
Figure 7D:
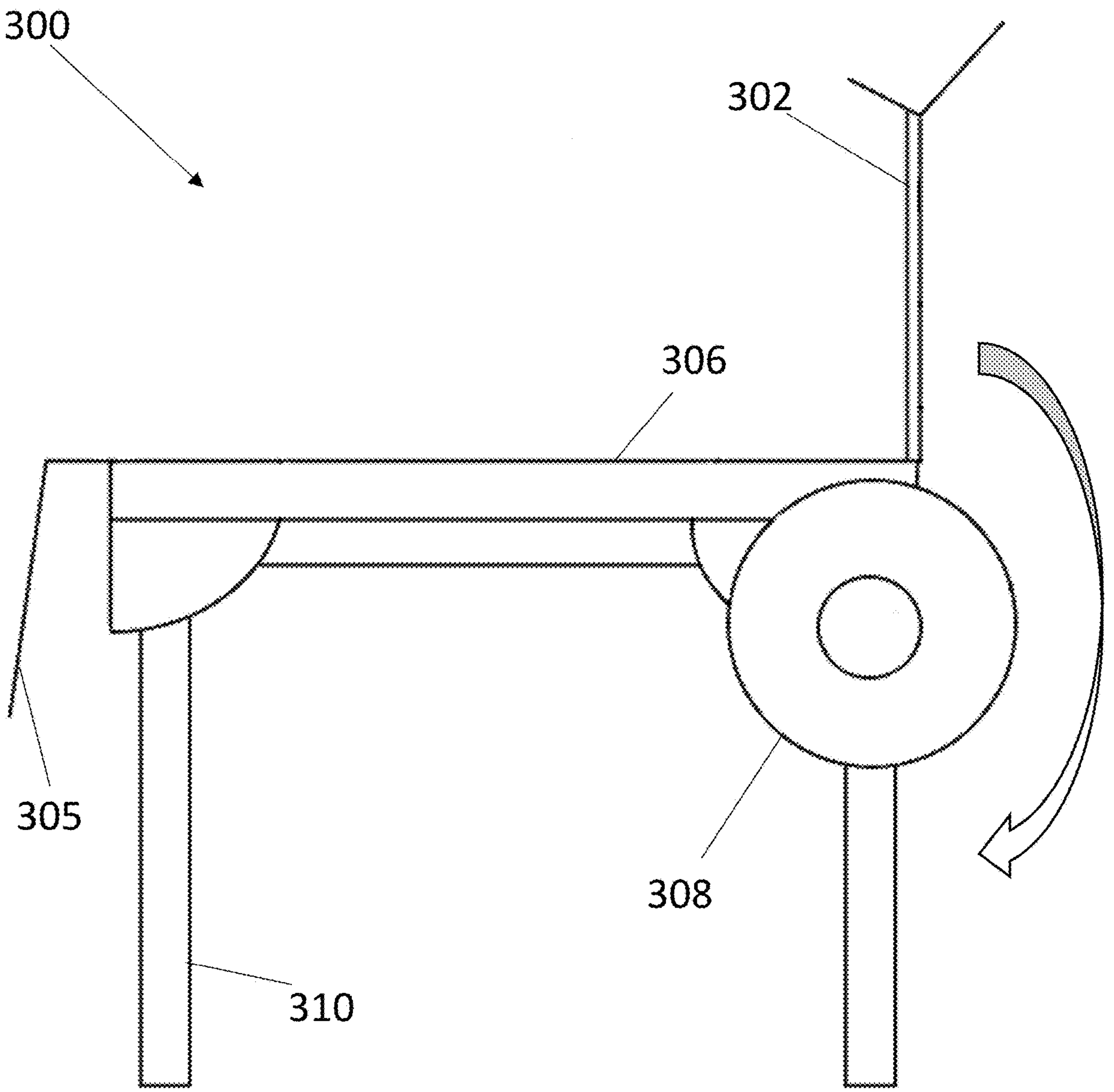
FIG. 7D illustrates a side orthogonal view of the foldable robotic arm mount of FIG. 7C, rotated such that the back of the component case carrying device now serves as the base of a table.
Figure 7E:
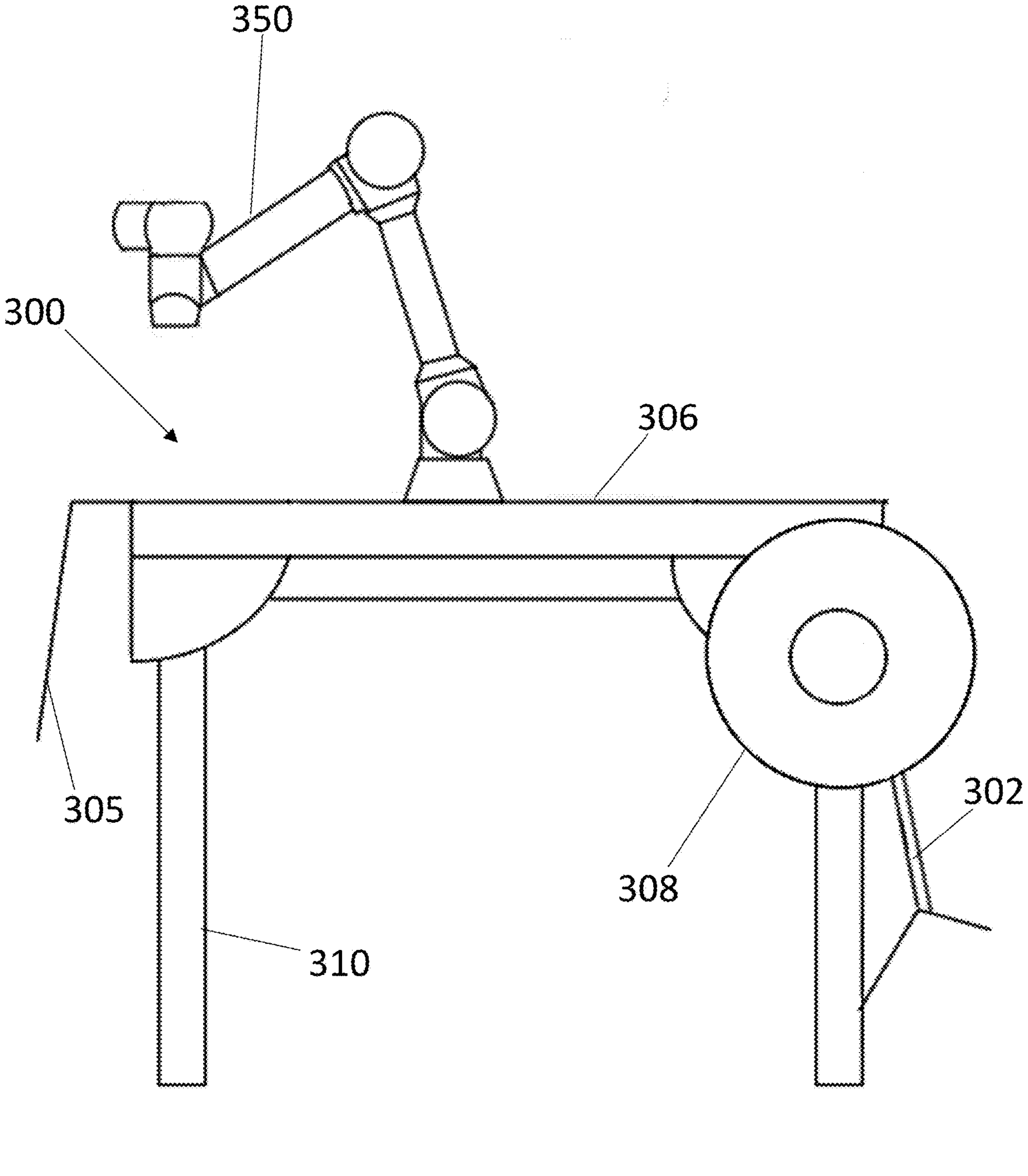
FIG. 7E illustrates a side orthogonal view of the foldable robotic arm mount of FIG. 7D including a robotic arm.

In a preferred embodiment, the robotic arm mount system 300 includes four legs 310, as shown in FIGS. 7C-7E. However, one of ordinary skill in the art will understand that the number of legs 310 of the robotic arm mount system 300 is not intended to be limiting, and the robotic arm mount system is able to include two or any greater number of legs. In one embodiment, the legs of the present invention are attached to the mount surface at the four corners of the underside of the mount surface 306 (i.e., the side of the mount surface 306 to which the robotic arm does not attach) and are folded inwardly. In one embodiment, each leg retains its shape when folded into a compact configuration (i.e. a leg that is two feet in length when folded against the underside of the mount surface is two feet in length when unfolded from the mount surface). In one embodiment, each leg 310 is secured to the underside of the mount surface 306 to prevent unfolding of legs 310 while robotic arm mount system 300 is in motion. By way of example and not limitation, securing the legs 310 to the underside of the mount surface 306 is achieved through the use of a fastening clip, hinge, pin, or other method of securing a collapsible leg known to the art. In one embodiment of robotic arm mount system 300, each leg 310 folds and/or unfolds independently of the other. In one embodiment, the legs 310 of the present invention fold and/or unfold dependently (i.e., two or more legs are joined in such a way that removal of one leg from a secured position releases one or more joined legs from a secured position). In one embodiment, the legs 310 of the present invention unfold sequentially. In one embodiment, the legs 310 of the present invention unfold simultaneously. In one embodiment, the legs 310 of the present invention collapse telescopically into a compact configuration on the underside of the mount surface. In one embodiment, the legs 310 of the present invention are manually folded and unfolded. In one embodiment, the telescopic legs 310 of the present invention are manually collapsed and extended.

In one embodiment, the robotic mount system of the present invention is in wireless connection with at least one electronic device including at least a processor and a memory, such as a server, blade server, mainframe, mobile phone, personal digital assistant (PDA), smartphone, desktop computer, netbook computer, tablet computer, workstation, laptop, and other similar computing devices. In one embodiment, the legs are automatically, folded, unfolded, expanded, and/or retracted via wireless connection with at least one electronic device. In one embodiment, the legs are simultaneously unfolded automatically via wireless connection with at least one electronic device. In one embodiment, the legs are sequentially unfolded via wireless connection with at least one electronic device. In one embodiment, telescopic legs are simultaneously extended automatically via wireless connection with at least one electronic device. In one embodiment, telescopic legs are sequentially extended automatically via wireless connection with at least one electronic device.

In one embodiment, the telescopic legs of the present invention are locked into a set length via quick release pins. In another embodiment, the telescopic legs of the present invention are locked into a set length via adjustable height pins. In another embodiment, the telescopic legs of the present invention are locked into a set length via an adjustable lock known to one of ordinary skill in the art.

The wheels 308 are rotatably fixed on an axis at the intersection of the ledge 302 and the mountable surface 306 on opposite sides of the robotic arm mount system 300. The wheels 308 are situated on an external side of the robotic arm mount system 300 in such a way that the wheels do not interfere with the movement (i.e. folding, unfolding, extension, etc.) of the collapsible legs. The handle 305 provides a surface to grip and move the transportation embodiment if the present invention, allowing for easy maneuverability of the robotic arm mount system 300. In one embodiment, the wheels 308 are omnidirectional wheels, such as those described in, by way of example and not limitation, U.S. Pat. Nos. 10,071,596, 11,273,668, and/or 10,369,839.

FIG. 7A depicts a storage case 304 with a ledge 302 of robotic arm mount system 300. In one embodiment, storage case 304 contains a robotic arm for nondestructive testing. The combined use of robotic arm mount system 300 and storage case 304 allows a user to conveniently transport both the robotic arm and the robotic arm mount. In one embodiment, the robotic arm mount system 300 is tilted to lift the ledge 302 from the ground and allow for uninhibited movement of the robotic arm mount system 300. In one embodiment, the storage case 304 or other materials on the ledge maintain contact with the mount surface when the robotic arm mount system is in motion. In one embodiment, the storage case 304 is secured to the ledge 302 and/or the mountable surface 306 of the robotic arm mount system 300 in such a way that prevents movement of the storage case 304. By way of example and not limitation, storage case 304 is secured through the use of an elastic fastener (e.g., bungee cord), position lock (e.g. push and latch lock), clips, or another method of immobilization known to the art.

FIG. 7B illustrates a rolling transportation embodiment of the present invention. The robotic arm mount system 300 of the present invention includes collapsible legs not visible from an orthogonal side perspective, obscured by the mount surface 306. The legs are folded into a configuration flush and parallel to the mounting surface 306. The ledge 302 is perpendicular to the mount surface 306 of the robotic arm mount system 300 and parallel to the ground when in an upright configuration. The wheels 308 are located at the intersection of the ledge 302 and the mountable surface 306 on opposite sides of the robotic arm mount system 300 and are situated on an external side of the robotic arm mount system 300 in such a way that the wheels do not interfere with the extension of the legs. The handle 305 allows for easy maneuverability of the robotic arm mount system 300.

FIG. 7C illustrates a rolling transportation embodiment of the present invention. The robotic arm mount system 300 of the present invention includes collapsible legs 310 that extend outwardly from the corners of the mounting surface 306 when in an uncompacted or unfolded configuration.

In one embodiment, the legs 310 of the present invention unfold independently of each other. In one embodiment, the legs 310 of the present invention unfold sequentially. In one embodiment, the legs 310 of the present invention unfold simultaneously. In one embodiment, the legs 310 of the present invention are manually deployed, whether by unfolding or extending. In another embodiment, the legs 310 of the present invention are automatically deployed via a wireless connection to an electronic device.

The ledge 302 is perpendicular to the mount surface 306 of robotic arm mount system 300 and the ledge is parallel to the ground when in an upright configuration. The wheels 308 are located at the intersection of the ledge 302 and the mountable surface 306 on opposite sides of the robotic arm mount system 300 and are situated on an external side of the robotic arm mount system 300 in such a way that the wheels do not interfere with the extension of the legs 310. The handle 305 allows for easy maneuverability of the robotic arm mount system 300 when the legs 310 are folded. The handle 305 provides a means to leverage the table from an upright position into a horizontal position once legs 310 are extended in order to create a flat mount surface on which to place a robotic arm.

FIG. 7D illustrates a rolling transportation embodiment of the present invention where the legs 310 have been unfolded and the robotic arm mount system 300 has been rotated from a position that allows the extension of the legs 310 from a compact configuration to a horizontal position where the mount surface 306 is horizontal and reasonably level. The handle 305 is located opposite the ledge 302 and may be used to assist in rotation of the robotic arm mount system 300. When in a horizontal configuration, the mount surface 306 is parallel to the ground and held up by extended legs 310. In horizontal configuration, the wheel 308 located at the intersection of the mount surface 306 and the ledge 302 does not contact the ground. The ledge 302 is initially upright, perpendicular to the ground. In one embodiment of the present invention, the ledge 302 is configured to rotate from a position perpendicular to the mount surface 306 where the end of the ledge 302 not connected to the mount surface 306 faces upwards to a position perpendicular to the mount surface 306 where the end of the ledge 302 not connected to the mount surface 306 points towards the ground. One of ordinary skill in the art will appreciate the purpose of the rotating ledge 302 to remove the ledge 302 as an obstacle to the range of motion of a robotic arm placed on the mount surface 306.

In one embodiment, the removal of the ledge is achieved through rotation of the ledge to any degree. In one embodiment, the ledge is removably attached to the mount surface by a bracket, clamp, pin, hanger, or other method known to the art in such a way that the ledge supports weight when in an upright position and is operable to be removed. In one embodiment, the ledge is operable to be removed from the mount surface once the robotic arm mount system is in a horizontal configuration. In one embodiment, the joint attaching the ledge to the mount surface is spring loaded so that when cargo is removed from the ledge, the ledge folds into the mount surface in such a way that the attachment of the robotic arm is not inhibited. In one embodiment, the ledge collapses telescopically into the mount surface.

FIG. 7E illustrates a rolling transportation embodiment of the present invention where legs 310 have been unfolded and the robotic arm mount system 300 has been rotated from a position that allows the extension of legs 310 to a horizontal position where mount surface 306 is horizontal and reasonably level. When in a horizontal configuration, the mount surface 306 is parallel to the ground and held up by extended legs 310. The handle 305 is attached to mount surface 306 and located on an opposite side of the mount surface 306 as ledge 302. The handle 305 is configure in such a way that it does not interfere with the movement of the robotic arm 350 attached to mount surface 306. In horizontal configuration, the wheel 308 located at the intersection of the mount surface 306 and the ledge 302 does not contact the ground. In one embodiment, the ledge 302 is not removed, rotated, telescopically collapsed, or otherwise resituated from an upright position perpendicular to the mount surface 306 where the end of the ledge 302 not connected to the mount surface 306 faces upwards. In one embodiment, the ledge 302 does not interfere with the movement of the robotic arm 350.

In one embodiment, the robotic arm 350 is secured in place via a locking mechanism upon addition of the arm to the mount surface 306. One of ordinary skill in the art will understand the methods and structure necessitated by a locking mechanism, for example a twist and lock system or similar locking mechanism. In one embodiment, the robotic arm 350 is inserted into a cavity in the mount surface and rotated a number of degrees after which point a locking mechanism secures the robotic arm 350 in place. In one embodiment, the robotic arm 350 must be rotated in an opposite direction a number of degrees in order to disengage the locking mechanism and remove the robotic arm 350 from the mount surface 306. In one embodiment, the robotic arm 350 is inserted into the cavity of the mount surface 306 and a locking mechanism secures the robotic arm 350 in place without requiring rotation of the robotic arm 350. In one embodiment, the lock is manually released by pressing a button, lever, or other locking control. In one embodiment, a lock is automatically released via input from an electronic device.

Figure 8A:
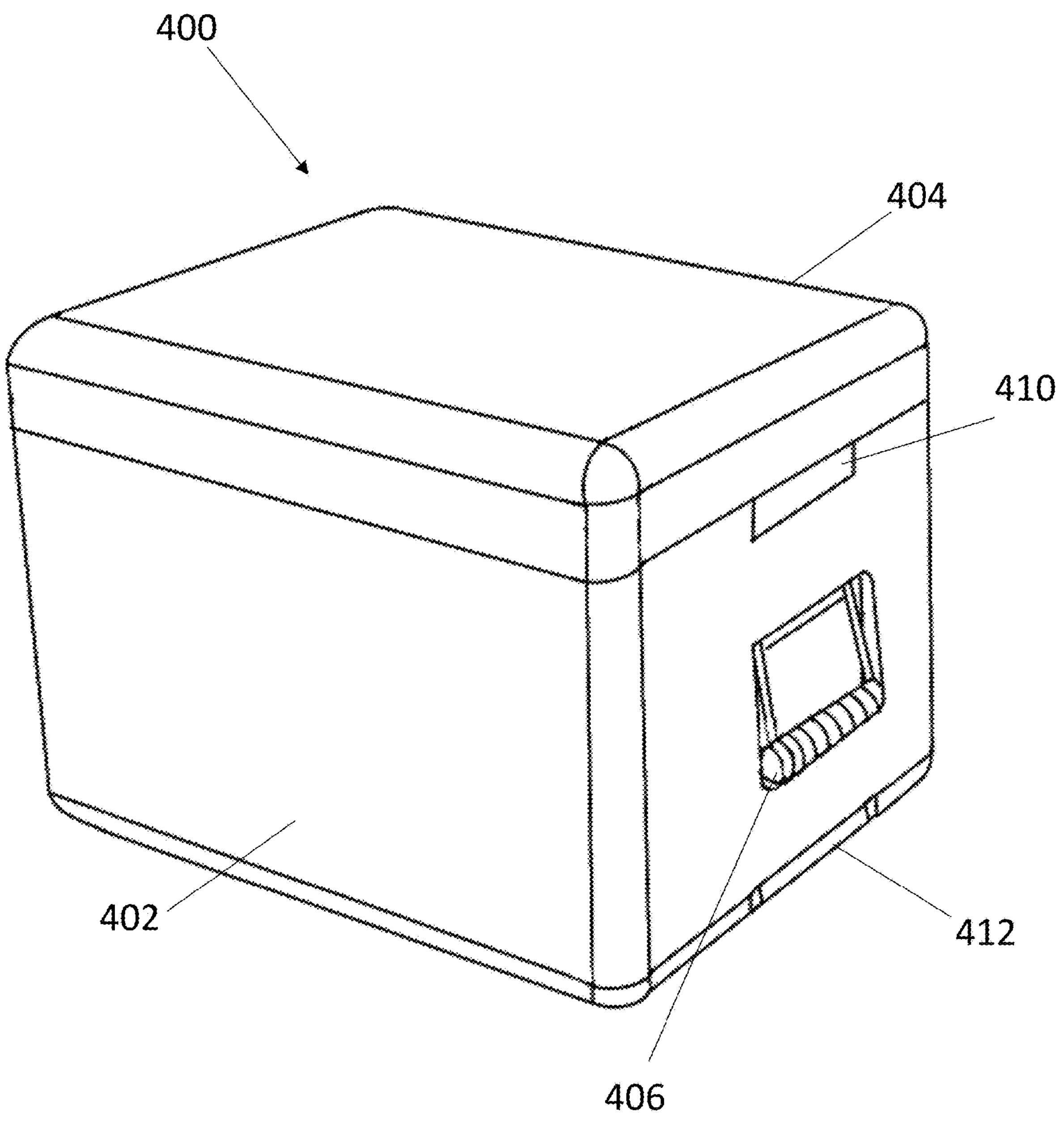
FIG. 8A illustrates an isometric view of a robotic arm component carrying case according to one embodiment of the present invention.

FIG. 8A illustrates another embodiment of the present invention wherein the robotic arm mount system 400 is a transportable case with a base 402 and a lid 404. The case has an extendable, rotatable, or otherwise movable ledge mount 410 that is connected to the base 402. When in a compact configuration, extendable ledge mount 410 is flush with the surface of the case in such a way that the exterior of the case is smooth and uninterrupted. This allows for ease of transport and minimizes the risk of damage done to the robotic arm mount system 400 therein by limiting protruding surfaces or components. The case has a second extendable, rotatable, or otherwise movable ledge 412 located at the bottom of the base 402 on the same side of the case as extendable ledge mount 410.

The case has a handle 406. The handle 406 may be a traditional handle, a telescopic handle, or any other type of handle known to the art. In one embodiment, transportable robotic arm mount system 400 includes a singular handle 406. In one embodiment, the handle 406 is located on the same side as ledge mount 410 and ledge 412. In one embodiment, the handle 406 is located on the opposite side of the case as the ledge mount 410 and the ledge 412. In one embodiment, the robotic arm mount system 400 is a transportable case with wheels located on the opposite side of the case as handle 406, wherein when the handle 406 is pulled, the wheels contact the ground and facilitate movement of the case. In one embodiment, transportable robotic arm mount system 400 includes multiple handles 406 in order to easily transport the case.

Figure 8B:
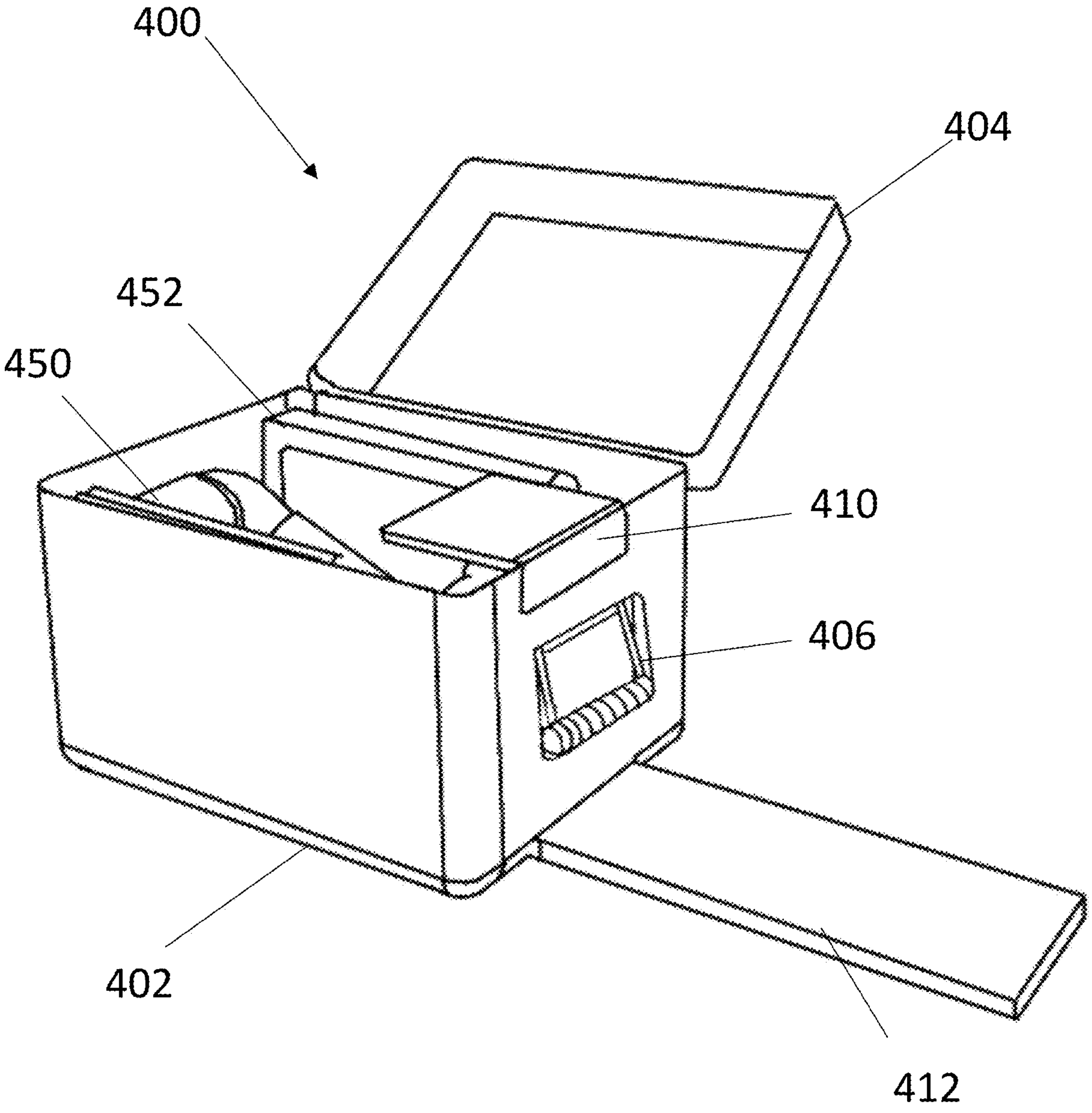
FIG. 8B illustrates an isometric view of the robotic arm component carrying case of FIG. 8A in an open position with a side base fully extended.

FIG. 8B illustrates the transportable case embodiment of the present invention wherein the robotic arm mount system 400 is a transportable case with a base 402, a lid 404, and a handle 406. The ledge 412 extends outwardly lengthwise from the base 402 of the case, providing a solid surface for placement of robotic arm support, mount, or other materials. Further, extension of the ledge 412 provides stability for the robotic arm mount system 400.

In one embodiment, the transportable case of the present invention includes extendable legs built into the base. In one embodiment, the extendable legs are a fixed length, folding outwardly from base of the mount case. In one embodiment, the legs are telescopic, allowing for reasonable adjustment of height and distance to the ground and minimizing the space required to store the legs when in a retracted configuration.

In a preferred embodiment, the lid 404 hingedly opens to allow access to materials within the case, including robotic arm 450 and a teach pendant 452. In one embodiment, the lid 404 is fully removed from the bottom of the case to access contents within the case. In one embodiment, robotic arm 450 is attached to the ledge mount 410 and is stored within the case when the ledge mount 410 is folded or otherwise compacted. In one embodiment, the robotic arm 450 is detached from the ledge mount 410 and placed within the base 402 of the case for transportation. In one embodiment, the case includes at least one compartment for storing cables, peripherals, or other items relating to operation of the system stored in the case.

One of ordinary skill in the art will appreciate that nondestructive testing of a specimen using a robotic arm may include subcomponents other than a teach pendant 452 and a robotic arm 450 (e.g., robotic arm mount support, ultrasound transmitters/receivers). One of ordinary skill in the art will understand that the robotic arm mount case system 400 is operable to store and transport multiple components of a robotic arm testing system beyond those specifically illustrated in FIG. 8A.

Figure 8C:
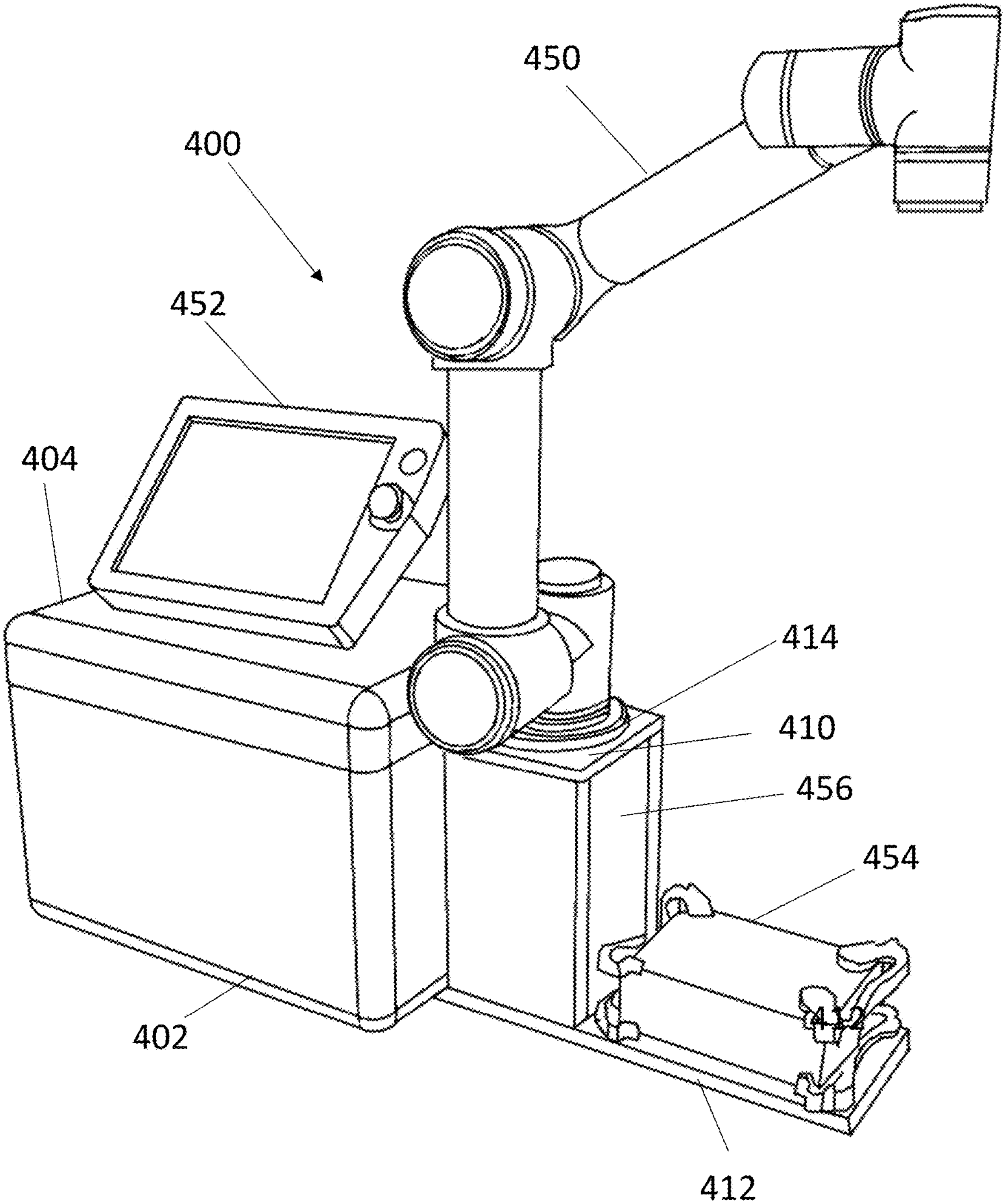
FIG. 8C illustrates an isometric view of the robotic arm component carrying case of FIG. 8B with a robotic arm and a display mechanism mounted to the robotic arm component carrying case.

FIG. 8C illustrates the transportable case embodiment of the present invention wherein the robotic arm mount system 400 is a transportable case with base 402 and lid 404. The robotic arm 450 and ledge mount 410 have been extended out from the interior of the case. Robotic arm mount support 456 is removed from the interior of the case and placed on the extendable ledge 412 beneath the ledge mount to brace the ledge mount and ensure stability of the robotic arm mount system 400 as the robotic arm 450 moves.

The teach pendant 452 is placed on the surface of the closed case lid 404 and used to manipulate the robotic arm via wireless communication connections known to one of ordinary skill in the art of nondestructive testing. Additionally, ultrasound transmitter/receiver 454 is placed on the extendable ledge 412 beside the robotic arm mount support 456. In one embodiment, ultrasound transmitter/receiver 454 is stored within the case along with the teach pendant 452, the robotic arm 450, and the robotic arm mount support 456. In one embodiment, a controller (e.g., supplying power and providing programmable control boards (PCBs) for controlling the robotic arm) is stored within the case and/or below the extendable ledge 412.

The robotic arm connector 414 provides a mechanism for a locking attachment of robotic arm 450 to ledge mount 410.

One of ordinary skill in the art will understand the methods and structure necessitated by a locking mechanism, for example a twist and lock system or similar locking mechanism. In one embodiment, the robotic arm is inserted into a robotic arm connector of the ledge mount and rotated a number of degrees after which point a locking mechanism secures the robotic arm in place. In one embodiment, the robotic arm must be rotated in an opposite direction a number of degrees in order to disengage the locking mechanism and remove the robotic arm from the robotic arm connector of the ledge mount. In one embodiment, the robotic arm is inserted into the robotic arm connector of the ledge mount and a locking mechanism secures the robotic arm in place without requiring rotation of the robotic arm. In one embodiment, the lock is manually released by pressing a button, lever, or other locking control. In one embodiment, a lock is automatically released via input from an electronic device.

In one embodiment, the system of the present invention includes a depth sensor for motion planning. The depth sensor is preferably located on the end of the robotic arm closest to the test specimen, attached to a plate on the same side of the plate as the end effector. Depth sensing technology includes but is not limited to an RGBD camera, a stereo depth camera, and/or a LiDAR sensor. The inclusion of a depth camera is advantageous for NDT inspection of specimens with complex, curved surfaces as the movement of the robotic arm is operable to be planned according to the curvature of the surface. For example, an RGBD camera is operable to create a course grid of a curved surface by taking a collection of photographs of the surface, stitching the photographs together, and colorizing the photographs based on depth points detected by the camera. In this way, an RGBD camera is operable to determine a normal distance to the surface of the specimen. The movement of the robotic arm is then planned according to the detected curvature of the surface in order to maintain a standard distance (e.g., 40 cm) and normal orientation to the surface of the specimen. The ability to plan the movement of the robotic arm is advantageous over systems of the prior art, as the maintenance of a normal distance and orientation in relation to curved surfaces of a specimen allows for increased accuracy of inspection. The ability of the base of the present invention to anchor the robotic arm to the ground allowing for a spherical range of motion that existing gantry systems are incapable of achieving, thereby enabling the motion planning facilitated by the depth sensing technology.

In one embodiment of the present invention, the robotic arm mount is all encompassing (i.e., all necessary hardware components are incorporated into the mount, including the pulser/receiver). The incorporation of hardware components into the mount of the present invention creates a compact inspection system which is readily deployable, as it does not require the connecting of cables to the mount, set up of various hardware components, and other time consuming steps required for systems that are not all encompassing. Thus, the present invention is increasingly useful for rapid, on-site inspection.

In one embodiment, the mount base of the present invention is fixed to a dual axis rail system to increase the area available for inspection to the system of the present invention. Extendable legs (telescopic, foldable, or otherwise collapsible and extendable) are attached to the rail system in order to anchor the rails and stabilize the moving mount and/or robotic arm. In one embodiment, the mount is fixed to the dual axis rail system via fastening, welding, or other method known to the art. In one embodiment, the mount is removable from the dual axis rail system. In one embodiment, movement of the mount along the dual axis rails is controlled via a handheld device over a wireless remote network.

In one embodiment of the present invention, the robotic arm mount includes one or more scissor lift extensions attached to the mount, thereby allowing the robotic arm mount and/or the robotic arm to be raised and lowered to increase the spherical area of inspection. In one embodiment, the scissor lift extension is attached to the mount base. In one embodiment, the scissor lift extensions are included in lieu of or in addition to the legs of the mount base. In one embodiment, a scissor lifting extension attaches the robotic arm mount to a plate or platform with a cavity for attachment of a robotic arm. In one embodiment, the scissor lift extension is hydraulic. In one embodiment, extension of the scissor lift is controlled by a device through a wireless remote network. In another embodiment, the scissor lift is manually extended.

One of ordinary skill in the art will understand that the present invention is not limited to applications in non-destructive testing. In addition to the robotic arm holding inspection elements, in another embodiment, the robotic arm is capable of holding end effectors operable to clean, sand, cut, scarf, mill, drill, weld, seal, spray, or apply couplant to a structure. In one embodiment, the system of the present invention is operable to be used for repairing damaged specimens. This is accomplished through the use of unique end effectors attached to the robotic arm which are equipped for maintenance and repair of a specimen (e.g., welding and/or administering cold spray). One of ordinary skill in the art will understand that there are a variety of maintenance and repairing methods accomplished through the use of unique robotic arm end effectors for which the stability and motion planning capabilities of the present invention is advantageous in applying.

Figure 9:
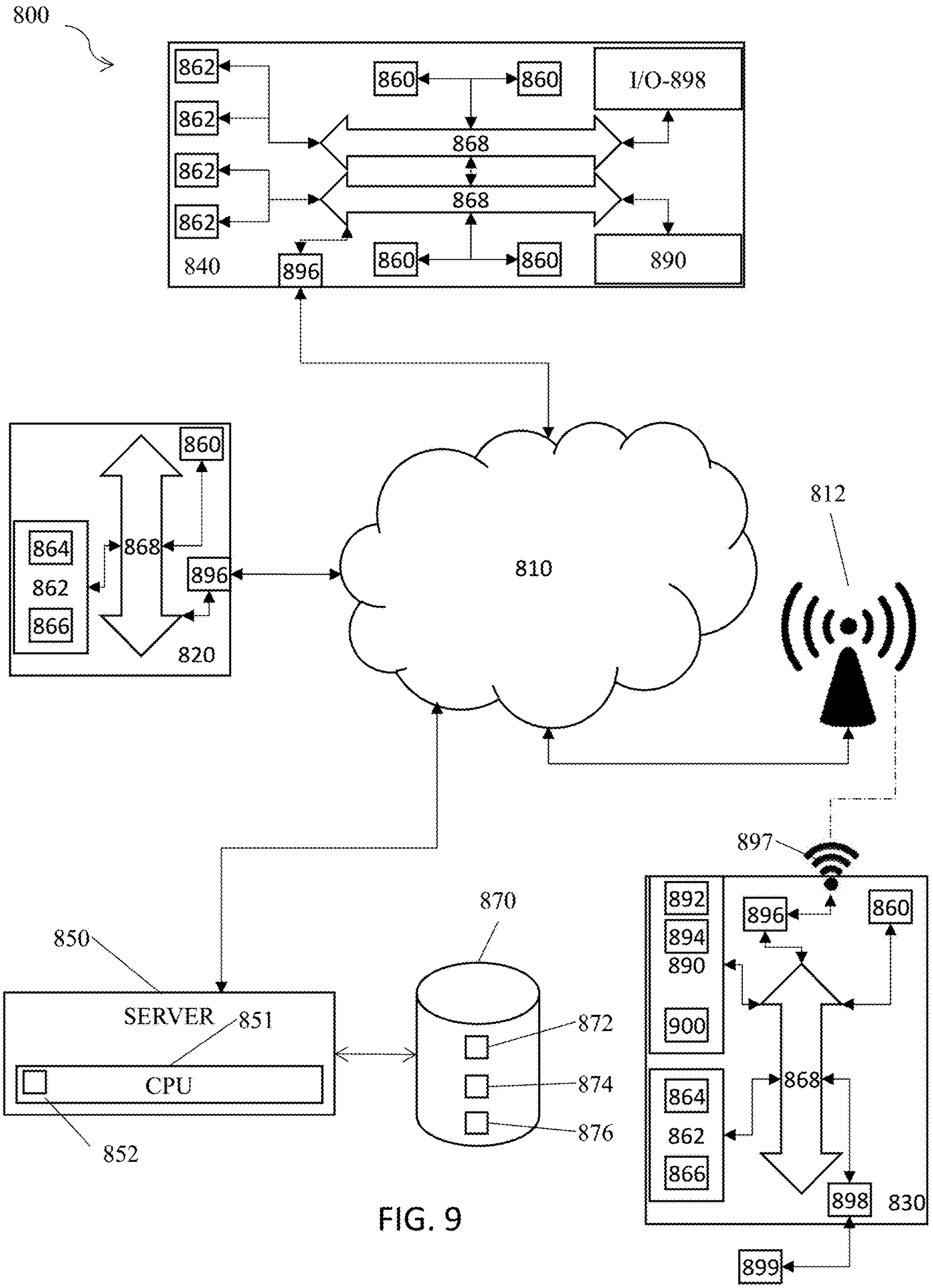
FIG. 9 is a schematic diagram of a system of the present invention.

FIG. 9 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 9, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 9, is operable to include other components that are not explicitly shown in FIG. 9, or is operable to utilize an architecture completely different than that shown in FIG. 9. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A deployable robotic arm mount, comprising:
- a base, including a plurality of sides;
- a plurality of legs, each including a first end and a second end, wherein the first end is connected to a bottom end of the base, and wherein the second end is pivotally connected to one of a plurality of feet; and
- a plurality of suction cups attached to an end of each of the plurality of feet;
- wherein the plurality of legs are configured to pivotably fold into a storage position and unfold into a deployed position;
- wherein a top surface of the base defines an insertion bore configured to receive a mounting portion of a robotic arm;
- wherein the plurality of suction cups are configured to attach to at least one surface such that the robotic arm is supported by the plurality of suction cups;
- wherein each of the plurality of sides of the base include recesses sized and shaped to allow the plurality of legs to fold parallel to a central axis of the base in the storage position; and
- wherein the plurality of suction cups are operable to secure the plurality of legs to the base in the storage position.

2. The robotic arm mount of claim 1, wherein the plurality of legs include one or more actuators, which, upon activation, inject air beneath the plurality of suction cups to release the plurality of suction cups.

3. The robotic arm mount of claim 1, wherein the base includes four sides and the plurality of legs includes four legs.

4. The robotic arm mount of claim 1, wherein the second end of each of the plurality of legs further includes one or more magnets configured to connect the plurality of legs to a mounting surface.

5. The robotic arm mount of claim 1, wherein the robotic arm mount is attached to a mobile platform.

6. The robotic arm mount of claim 1, wherein, in the deployed position, a central axis of each of the plurality of legs is approximately 35° relative to a surface to which the robotic arm mount is mounted.

7. The robotic arm mount of claim 1, wherein the base includes one or more driver motors configured that, upon activation, cause one or more of the plurality of legs to move between the storage position and the deployed position.

8. A deployable robotic arm mount, comprising:
- a base, including a plurality of sides;
- a plurality of legs connected to a bottom end of the base, configured to pivotably fold into a storage position and unfold into a deployed position;
- a plurality of feet, each connected to an end of one of the plurality of legs; and
- at least one suction cup attached to each of the plurality of feet;
- wherein a top surface of the base defines an insertion bore configured to receive a mounting portion of a robotic arm;
- wherein the at least one suction cup is configured to attach to at least one surface such that the robotic arm is supported by the at least one suction cup;
- wherein the plurality of sides of the base include recesses sized and shaped to allow the plurality of legs to fold parallel to a central axis of the base in the storage position; and
- wherein the at least one suction cup is operable to secure the plurality of legs to the base in the storage position.

9. The robotic arm mount of claim 8, wherein, in the storage position, a central axis of each of the plurality of feet is substantially parallel to a central axis of the one of the plurality of legs to which each of the plurality of feet is attached.

10. The robotic arm mount of claim 8, wherein, in the storage position, the plurality of feet are positioned between the base and the plurality of legs.

11. The robotic arm mount of claim 8, wherein, in the deployed position, the plurality of feet are substantially parallel with a surface to which the robotic arm mount is attached.

12. The robotic arm mount of claim 8, wherein the plurality of feet include one or more actuators, which, upon activation, inject air beneath the at least one suction cup to release the at least one suction cup.

13. The robotic arm mount of claim 8, wherein the robotic arm mount is attached to a mobile platform.

14. The robotic arm mount of claim 8, wherein, in the deployed position, a central axis of each of the plurality of legs is approximately 35° relative to a surface to which the robotic arm mount is mounted.

15. The robotic arm mount of claim 8, wherein the base includes one or more driver motors configured that, upon activation, cause one or more of the plurality of legs to move between the storage position and the deployed position.

16. A deployable robotic arm mount, comprising:
- a base, including a plurality of sides;
- a plurality of legs connected to a bottom end of the base, configured to pivotably fold into a storage position and unfold into a deployed position;
- a plurality of feet, each connected to an end of one of the plurality of legs; and
- a plurality of suction cups attached to each of the plurality of feet;
- wherein a top surface of the base defines an insertion bore configured to receive a mounting portion of a robotic arm;

wherein the plurality of sides of the base include recesses sized and shaped to allow the plurality of legs to fold parallel to a central axis of the base in the storage position;

wherein the plurality of suction cups are configured to attach to at least one surface such that the robotic arm is supported by the plurality of suction cups;

wherein the base includes one or more driver motors configured that, upon activation, cause one or more of the plurality of legs to move between the storage position and the deployed position; and wherein the plurality of suction cups are operable to secure the plurality of legs to the base in the storage position.

17. The robotic arm mount of claim 16, wherein each of the plurality of feet are attached to one or more magnets.

18. The robotic arm mount of claim 16, wherein the robotic arm mount is attached to a mobile platform.

19. The robotic arm mount of claim 16, wherein the one or more driver motors are connected to at least one wireless receiver operable to receive commands from a user device.

* * * * *